US012595324B2

(12) United States Patent
Zhang et al.

(10) Patent No.: US 12,595,324 B2
(45) Date of Patent: Apr. 7, 2026

(54) ETHYLENE COPOLYMERS AND USE AS VISCOSITY MODIFIERS

(71) Applicants: Chevron Oronite Company LLC, Richmond, CA (US); ExxonMobil Chemical Patents Inc., Houston, TX (US)

(72) Inventors: Sara Zhang, Danville, CA (US); Maryam Sepehr, San Ramon, CA (US); David Morgan, Pleasanton, CA (US); Jingwen Zhang, Houston, TX (US)

(73) Assignees: Chevron Oronite Company LLC, Richmond, CA (US); ExxonMobil Chemical Patents Inc., Houston, TX (US)

(*) Notice: Subject to any disclaimer, the term of this patent is extended or adjusted under 35 U.S.C. 154(b) by 0 days.

(21) Appl. No.: 17/635,500

(22) PCT Filed: Aug. 25, 2020

(86) PCT No.: PCT/US2020/047790
§ 371 (c)(1),
(2) Date: Feb. 15, 2022

(87) PCT Pub. No.: WO2021/041406
PCT Pub. Date: Mar. 4, 2021

(65) Prior Publication Data

US 2022/0289882 A1 Sep. 15, 2022

Related U.S. Application Data

(60) Provisional application No. 62/896,253, filed on Sep. 5, 2019, provisional application No. 62/892,279, filed on Aug. 27, 2019.

(51) Int. Cl.
*C08F 210/16* (2006.01)
*C08F 2/06* (2006.01)
(Continued)

(52) U.S. Cl.
CPC .............. *C08F 210/16* (2013.01); *C08F 2/06* (2013.01); *C10M 143/02* (2013.01);
(Continued)

(58) Field of Classification Search
CPC ...... C08F 210/16; C08F 2/06; C08F 4/64113; C10M 143/02; C10M 143/04;
(Continued)

(56) References Cited

U.S. PATENT DOCUMENTS 3,778,375 A 12/1973 Braid et al.
3,779,928 A 12/1973 Schlicht
(Continued)

FOREIGN PATENT DOCUMENTS

EP 0638611 A1 2/1995
EP 0573120 B1 11/1998
(Continued)

OTHER PUBLICATIONS

International Search Report and Written Opinion for PCT/US2020/047790, mailed Dec. 9, 2020, 8 pages.
(Continued)

*Primary Examiner* — Cephia D Toomer
(74) *Attorney, Agent, or Firm* — Eric D. Babych; Barnes & Thornburg LLP

(57) ABSTRACT

In some embodiments, the present disclosure provides for ethylene-$C_3$ to $C_{20}$ alpha-olefins random copolymers having an ethylene content of about 45 wt % to about 70 wt % and a Mw(DRI)/Mn(DRI) of from 1.1 to 1.9. In some embodi-
(Continued)

Comparison of thickening efficiency as a function of shear stability index.

ments, the ethyl-C ene-propylene random copolymer is used as a viscosity modifier in a lubricating composition.

20 Claims, 1 Drawing Sheet

(51) Int. Cl.

| | |
|---|---|
| ***C10M 143/02*** | (2006.01) |
| ***C10M 143/04*** | (2006.01) |
| *C10N 20/04* | (2006.01) |
| *C10N 30/02* | (2006.01) |

(52) U.S. Cl.
CPC .... *C10M 143/04* (2013.01); *C10M 2205/022* (2013.01); *C10M 2205/024* (2013.01); *C10N 2020/04* (2013.01); *C10N 2030/02* (2013.01)

(58) Field of Classification Search
CPC ...... C10M 2205/022; C10M 2205/024; C10M 143/06; C10M 143/08; C10N 2020/04; C10N 2030/02
See application file for complete search history.

(56) References Cited

U.S. PATENT DOCUMENTS

| | | | | |
|---|---|---|---|---|
| 3,852,205 | A | 12/1974 | Kablaoui et al. | |
| 3,879,306 | A | 4/1975 | Kablaoui et al. | |
| 3,932,290 | A | 1/1976 | Koch et al. | |
| 3,933,659 | A | 1/1976 | Lyle et al. | |
| 4,028,258 | A | 6/1977 | Kablaoui et al. | |
| 4,105,571 | A | 8/1978 | Shaub et al. | |
| 4,176,074 | A | 11/1979 | Coupland et al. | |
| 4,344,853 | A | 8/1982 | Gutierrez et al. | |
| 4,464,493 | A | 8/1984 | Joffrion | |
| 4,540,753 | A | 9/1985 | Cozewith et al. | |
| 4,804,794 | A | 2/1989 | Ver Strate et al. | |
| 5,041,584 | A | 8/1991 | Crapo et al. | |
| 5,068,047 | A | 11/1991 | Chung et al. | |
| 5,153,157 | A | 10/1992 | Hlatky et al. | |
| 5,241,025 | A | 8/1993 | Hlatky et al. | |
| 5,391,617 | A | 2/1995 | Olivier et al. | |
| 5,447,895 | A | 9/1995 | Marks et al. | |
| 5,453,410 | A | 9/1995 | Kolthammer et al. | |
| 5,475,075 | A * | 12/1995 | Brant | C08F 210/16 526/348.3 |
| 5,942,459 | A | 8/1999 | Sugano et al. | |
| 6,103,657 | A | 8/2000 | Murray | |
| 6,211,105 | B1 | 4/2001 | Holtcamp | |
| 6,750,345 | B2 | 6/2004 | Boussie et al. | |
| 6,900,321 | B2 | 5/2005 | Boussie et al. | |
| 7,402,235 | B2 | 7/2008 | Huang | |
| 7,973,116 | B2 | 7/2011 | Hagadorn et al. | |
| 8,105,992 | B2 | 1/2012 | Schauder et al. | |
| 8,394,902 | B2 | 3/2013 | Hagadorn et al. | |
| 8,404,880 | B2 | 3/2013 | Kaji et al. | |
| 8,658,556 | B2 | 2/2014 | Stewart | |
| 8,975,209 | B2 | 3/2015 | Kaji et al. | |
| 9,321,858 | B2 | 4/2016 | Hagadorn et al. | |
| 9,340,630 | B2 | 5/2016 | Kaji et al. | |
| 2002/0142912 | A1 | 10/2002 | Boussie et al. | |
| 2003/0073785 | A1 * | 4/2003 | Okada | C08F 210/16 525/324 |
| 2004/0220050 | A1 | 11/2004 | Frazier et al. | |
| 2010/0227990 | A1 | 9/2010 | Kuhlman et al. | |
| 2011/0224391 | A1 | 9/2011 | Hagadorn et al. | |
| 2011/0301310 | A1 | 12/2011 | Hagadorn et al. | |
| 2012/0071616 | A1 | 3/2012 | Hagadorn et al. | |
| 2013/0131294 | A1 | 5/2013 | Hagadorn et al. | |

FOREIGN PATENT DOCUMENTS

| | | | |
|---|---|---|---|
| EP | 1 262 498 | A2 | 12/2002 |
| EP | 1262498 | B1 | 9/2008 |
| EP | 2243795 | A1 | 10/2010 |
| WO | 1991009882 | A1 | 7/1991 |
| WO | 1993014132 | A1 | 7/1993 |
| WO | 1994003506 | A1 | 2/1994 |
| WO | 1994007928 | A1 | 4/1994 |
| WO | 1995007941 | A1 | 3/1995 |
| WO | 1995014044 | A1 | 5/1995 |
| WO | 1998043983 | A1 | 10/1998 |
| WO | 2002038628 | A2 | 5/2002 |
| WO | 2005095469 | A1 | 10/2005 |
| WO | 2006036748 | A2 | 4/2006 |
| WO | 2007067965 | A2 | 6/2007 |
| WO | 2007130306 | A2 | 11/2007 |
| WO | 2010037059 | A2 | 4/2010 |
| WO | 2010126721 | A1 | 11/2010 |
| WO | 2015073157 | A1 | 5/2015 |
| WO | 2019173598 | A1 | 9/2019 |

OTHER PUBLICATIONS

Hu, Yeyuan et al. "Influence of Cooling Rate on Crystallization Behavior of Semi-Crystalline Polypropylene: Experiments and Mathematical Modeling." Polymers vol. 14, 17 3646. Sep. 2, 2022, doi:10.3390/polym14173646.
Ross, J. H., & Shank, R. L. (1973). Reproducibility of molecular weight measurements by GPC with infrared detectors. Advances in Chemistry, 108-116. https://doi.org/10.1021/ba-1973-0125.ch010.
Chemical and Engineering News, 63(5), p. 27 (1985).
Covitch, M.J., "Olefin Copolymer Viscosity Modifiers," Lubricant Additives, Chemistry and Applications, pp. 293-327.
Froese, R. D. J. et al., J. Am. Chem. Soc. 2007, 129, pp. 7831-7840.
Gibson, V. C.; Britovsek, G. J.P.; Wass, D. F. Angew, Chem. Int. Ed. 1999, 38, 428.
Gibson, V. C.; Spitzmesser, S. K. Chem. Rev. 2003, 103, 283.
Girolami, G.S., "A Simple 'Back of the Envelope' Method for Estimating the Densities and Molecular volumes of Liquids and Solids," Journal of Chemical Education, vol. 71, No. 11, Nov. 1994, pp. 962-964.
Guerin, F.; McConville, D. H.; Vittal, J. J. Organometallics 1996, 15, p. 5586.
J. Randall, Polymer Sequence Determination, 13C-NMR Method (Academic Press, New York, 1977).
J. Vladimir Oliveira, C. Dariva and J. C. Pinto, Ind. Eng. Chem. Res., 2000, vol. 29, p. 4627.
Marsden, K., "Literature Review of OCP Viscosity Modifiers," Lub. Sci. 1989, 1, 265-280.
McGuire, R. et al. Coordination Chemistry Reviews, vol. 254, No. 21-22, pp. 2574-2583, 2010.
Stambaugh, R.L., "Viscosity Index Improvers and Thickeners," Chemistry and Technology of Lubricants, 3rd edition, pp. 153-187, Springer, 2010.
T. Sun, P. Brant, R. R. Chance, and W. W. Graessley (Macromolecules, 2001, vol. 34(19), pp. 6812-6820).
Valente, A. et al., "Coordinative Chain Transfer Polymerization," P. Chem. Rev. 2013, 113, 3836-3857.
Van Meurs, M. et al., "Polyethylene Chain Growth on Zinc Catalyzed by Olefin Polymerization Catalysts: A Comparative Investigation of Highly Active Catalyst Systems across the Transition Series," J. Am. Chem. Soc. 2005, 127, 9913-9923.
Vaughan, A; Davis, D.S.; Hagadorn, J. R. in Comprehensive Polymer Science, vol. 3, Chapter 20, "Industrial catalysts for alkene polymerization".
Covitch, M.J. (2009) Olefin Copolymer Viscosity Modifiers. In: Lubricant Additives, CRC Press, Boca Raton, 293-327.

* cited by examiner

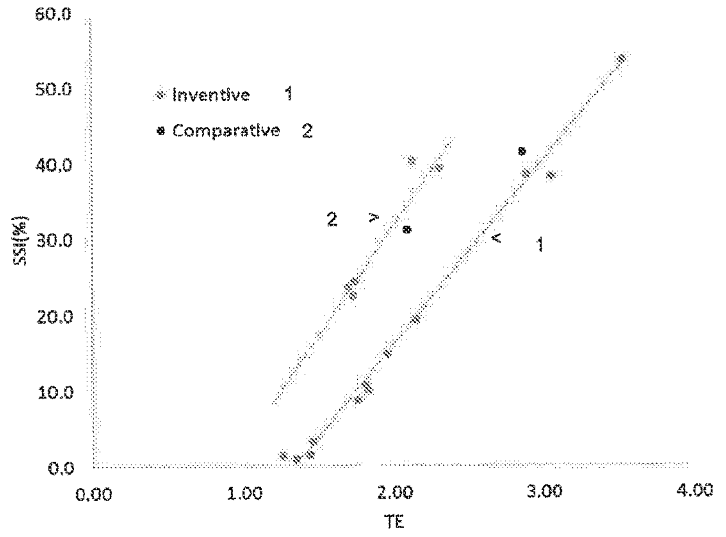
Comparison of thickening efficiency as a function of shear stability index.

ETHYLENE COPOLYMERS AND USE AS VISCOSITY MODIFIERS

CROSS REFERENCE TO RELATED APPLICATIONS

This application is a National Phase filing under 35 U.S.C. § 371 of PCT/US2020/047790 filed on Aug. 25, 2020; which in turn claims priority from U.S. Provisional Application 62/892,279, filed Aug. 27, 2019 and U.S. Provisional Application 62/896,253 filed Sep. 5, 2019. The disclosure of each is incorporated herein by reference. PCT/US2020/047790 is also related to PCT Application PCT/US19/21164, disclosure of which is incorporated herein by reference filed Mar. 7, 2019, which in turn claims priority from U.S. Provisional Application 62/640,323, filed Mar. 8, 2018; and to PCT Application PCT/US19/21173, disclosure of which is incorporated herein by reference filed Mar. 7, 2019, which in turn claims priority from U.S. Provisional Application 62/640,307, filed Mar. 8, 2018.

FIELD

The present disclosure relates to ethylene copolymers and the use of such polymers as lubricant additives, such as viscosity modifiers.

BACKGROUND

Lubrication fluids are applied between moving surfaces to reduce friction, thereby improving efficiency and reducing wear. Lubrication fluids also often function to dissipate the heat generated by friction between moving surfaces.

One type of lubrication fluid is a petroleum-based lubrication oil used for internal combustion engines. Lubrication oils contain additives that help the lubrication oil to have a certain viscosity at a given temperature. In general, the viscosity of lubrication oils and fluids is inversely dependent upon temperature. When the temperature of a lubrication fluid is increased, the viscosity generally decreases, and when the temperature is decreased, the viscosity generally increases. For internal combustion engines, for example, it is desirable to have a lower viscosity at low temperatures to facilitate engine starting during cold weather, and a higher viscosity at higher ambient temperatures when lubrication properties typically decline.

Additives for lubrication fluids and oils include rheology modifiers, such as viscosity index (VI) improvers. Viscosity index improving components, many of which are derived from ethylene-alpha-olefin copolymers, modify the rheological behavior of a lubricant to increase viscosity and promote a more constant viscosity over the range of temperatures at which the lubricant is used.

It is anticipated that the performance of VI improvers can be substantially improved, as measured by the thickening efficiency (TE) and the shear stability index (SSI), by appropriate and careful manipulation of the structure of the VI improver. Thickening efficiency (TE) as described in U.S. Pat. No. 8,105,992 is a relative measure of how much viscosity gain can be achieved by dissolution a polymer in a given reference oil. A polymer's shear stability index (SSI) is a measure of its resistance to mechanical degradation under shearing stress.

Olefin copolymers (OCP) viscosity modifiers with high thickening efficiency are advantageous in multi-grade finished lubricants to provide a lower formulation costs and a reduced risk of deposit formation. This benefit comes from lower usage of the polymer in the fully formulated oil. Traditionally and known in the art, the thickening efficiency of an OCP is increased by maximizing the ethylene content, but this puts the polymer at risk of causing low temperature performance shortcomings in a finished lubricant. Low temperature shortcomings may be mitigated use of blends of amorphous and semi-crystalline ethylene-based copolymers for lubricant oil formulations has allowed for increased thickening efficiency, shear stability index, low temperature viscosity performance and pour point. See, e.g., U.S. Pat. Nos. 7,402,235 and 5,391,617, and European Patent 0 638,611. Alternatively, if the OCP can be made with a narrower molecular weight distribution the thickening efficiency can also be increased (see U.S. Pat. No. 4,540,753).

There remains a need to further improve the thickening efficiency properties of polymers used as viscosity modifiers.

References of interest also include: 1) Vaughan, A; Davis, D. S.; Hagadorn, J. R. in Comprehensive Polymer Science, Vol. 3, Chapter 20, "Industrial catalysts for alkene polymerization"; 2) Gibson, V. C.; Spitzmesser, S. K. Chem. Rev. 2003, 103, 283; 3) Britovsek, G. J. P.; Gibson, V. C.; Wass, D. F. Angew. Chem. Int. Ed. 1999, 38, 428; 4) International Publication No. WO 2006/036748; 5) McGuire, R. et al. Coordination Chemistry Reviews, Vol 254, No. 21-22, pages 2574-2583 (2010); 6) U.S. Pat. No. 4,540,753; 7) U.S. Pat. No. 4,804,794; 8) P. Chem. Rev. 2013, 113, 3836-38-57; 9) J. Am. Chem. Soc. 2005, 127, 9913-9923; 10) Lub. Sci. 1989, 1, 265-280; 11) Lubricant Additives, Chemistry and Applications, pages 293-327, CRC Press, 2003; 12) Chemistry and Technology of Lubricants, 3rd edition, pages 153-187, Springer, 2010; 13) U.S. Publication No. 2013/0131294; 14) U.S. Publication No. 2002/0142912; 15) U.S. Pat. No. 6,900,321; 16) U.S. Pat. No. 6,103,657; 17) International Publication No. WO 2005/095469; 18) U.S. Publication No. 2004/0220050 A1; 19) International Publication No. WO 2007/067965; 20) Froese, R. D. J. et al., J. Am. Chem. Soc. 2007, 129, pp. 7831-7840; 21) International Publication No. WO 2010/037059; 22) U.S. Publication No. 2010/0227990 A1; 23) International Publication No. WO/0238628 A2; 24) Guerin, F.; McConville, D. H.; Vittal, J. J. *Organometallics* 1996, 15, p. 5586; 25) U.S. Pat. No. 7,973,116; 26) U.S. Pat. No. 8,394,902; 27) U.S. Publication No. 2011/0224391; 28) U.S. Publication No. 2011-0301310 A1; and 29) U.S. Pat. No. 9,321,858.

SUMMARY

The present disclosure relates to ethylene-$C_3$ to $C_{20}$ alpha-olefin copolymers and more specifically to ethylene-$C_3$ to $C_{20}$ alpha-olefins random copolymers having an ethylene content between about 45 wt % and about 70 wt % and a Mw(DRI)/Mn(DRI) of from 1.1 to 1.9. The ethylene-$C_3$ to $C_{20}$ alpha-olefins random copolymers can be synthesized using pyridyldiamido (PDA) catalysts and an added chain transfer agent (CTA) as disclosed in PCT/US19/21164.

Another aspect of the present invention is the use of the copolymers as viscosity modifiers in oil.

BRIEF DESCRIPTION OF THE FIGURES

The FIGURE illustrates only exemplary embodiments and therefore is not to be considered limiting of scope of the present invention, for the disclosure may admit to other equally effective embodiments.

FIG. 1 is a comparison plot thickening efficiency as a function of shear stability index.

DETAILED DESCRIPTION

Viscosity modifiers, when added to oils, reduce the tendency of the oil to change its viscosity with temperature in order to improve its viscosity index (VI) and flow characteristics. Improving VI helps in maintaining constant the flow properties of the protective oil film. This means a high enough viscosity to avoid damage on engine parts when the temperature rises because of the engine heat and a low enough viscosity against the cold start and pumping.

To make sure the viscosity modifier (VM) is used in a cost-effective way, polymer thickening efficiency is important. Thickening efficiency (TE) as described in U.S. Pat. No. 8,105,992 is a relative measure of how much viscosity gain can be achieved by dissolution a polymer in a given reference oil.

TE is primarily a function of polymer chemistry and molecular weight. Large molecules are better thickeners than small ones and, at the same molecular weight, some polymer chemistries are better thickeners than others. There is a trade-off, though. While large molecules are good thickeners, they are also more easily broken, which impacts the shear stability of the oil. The shear stability index (SSI) of a polymer is a measure of its resistance to mechanical degradation under shearing stress.

Ethylene-propylene (EP) copolymers as viscosity modifiers with enhanced thickening efficiency to shear stability index (TE/SSI) balance can be made via Coordinated Chain Transfer Polymerization (CCTP) using a pyridyldiamido (PDA) catalyst and an added chain transfer agent (CTA), such as diethylzinc. Improvements to low temperature properties can be limited due to higher ethylene content.

In order to improve low temperature properties, the C2 (ethylene) wt % of the resulting polymer should be close to 50%, having more randomness, and not having enough ethylene content or another monomer's content (i.e., propylene) to promote crystallization. In addition, a new OCP-based VM grade polymer with lower SSI values allows for better mechanical shear stability and compatibility in lower viscosity base oils.

Characteristics of the OCP that mainly affect performance aspects, including TE and SSI, are the ratio of ethylene to propylene, the molecular weight of the polymer, and the molecular weight distribution of the polymer. Ethylene-propylene ratio of the VM can also impact low temperature properties of the lubricant, including cold cranking simulator (CCS, ASTM D5293) and pour point (ASTM D97) performance.

In this disclosure, the ethylene-$C_3$ to $C_{20}$ alpha-olefins random copolymers can be synthesized from pyridyldiamido (PDA) catalysts and an added chain transfer agent (CTA), as disclosed in PCT/US19/21164.

In at least one embodiment, the EP copolymers produced by the methods disclosed herein have Mw(DRI) about 500 kg/mol or less, more preferred about 300 kg/mol or less, more preferred about 250 kg/mol or less, and most preferred about 200 kg/mol or less. For instance, in certain embodiments the Mw(DRI) is from about 50,000 g/mol to about 250,000 g/mol; and more typically from about 50,000 g/mol to about 200,000 g/mol.

In at least one embodiment, the ethylene content is preferred to be 70 wt % or less, more preferred about 60 wt % or less, and most preferred about 55 wt % or less. For instance, in certain embodiments the ethylene content is from about 45 wt % to about 70 wt %, preferably the ethylene content is from about 45 wt % to about 60 wt % and more preferably from about 45 wt % to about 55 wt %. In certain embodiments the ethylene content is at least 51 wt %, more typically 51 wt % to less than 70 wt %, even more typically 51 wt % to about 60 wt %; and most typically 51 wt % to about 55 wt %.

In at least one embodiment, the PDI value is 1.1 to 1.9, preferably less than 1.7, more preferably 1.6 or lower and most preferably less than 1.4. In certain embodiments, the PDI value is not 1.40 or 1.48.

For purposes herein, the numbering scheme for the Periodic Table Groups is used as described in Chemical and Engineering News, 63(5), pg. 27 (1985). For example, a "Group 4 metal" is an element from Group 4 of the Periodic Table, e.g., Hf, Ti, or Zr.

As used herein, an "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 45 wt % to 55 wt %, it is understood that the monomer ("mer") unit in the copolymer is derived from ethylene in the polymerization reaction and said derived units are present at 45 wt % to 55 wt %, based upon the weight of the copolymer.

A "polymer" has two or more of the same or different monomer ("mer") units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers.

For purposes of this disclosure, ethylene shall be considered an α-olefin.

As used herein, the term "substituted" means that a hydrogen group has been replaced with a heteroatom, or a heteroatom-containing group. For example, a "substituted hydrocarbyl" is a radical made of carbon and hydrogen where at least one hydrogen is replaced by a heteroatom or heteroatom-containing group.

As used herein, Mn is number average molecular weight, Mw is weight average molecular weight, and Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, Mz) are g/mol.

Copolymers (and terpolymers) of polyolefins have a comonomer, such as propylene, incorporated into the polyethylene backbone. These copolymers (and terpolymers) provide varying physical properties compared to polyethylene alone and are typically produced in a low pressure reactor, utilizing, for example, solution, slurry, or gas phase polymerization processes. The comonomer content of a polyolefin (e.g., wt % of comonomer incorporated into a polyolefin backbone) influences the properties of the polyolefin (and composition of the copolymers) and is dependent on the identity of the polymerization catalyst.

"Linear" means that the polymer has few, if any, long chain branches and typically has a g'vis (branching index) value of about 0.97 or above, such as about 0.98 or above.

The term "cyclopentadienyl" refers to a 5-member ring having delocalized bonding within the ring and typically being bound to M through $\eta^5$-bonds, carbon typically making up the majority of the 5-member positions.

As used herein, a "catalyst" includes a single catalyst, or multiple catalysts with each catalyst being conformational isomers or configurational isomers. Conformational isomers include, for example, conformers and rotamers. Configurational isomers include, for example, stereoisomers.

The term "complex," may also be referred to as catalyst precursor, precatalyst, catalyst, catalyst compound, transition metal compound, or transition metal complex. These words are used interchangeably. Activator and cocatalyst are also used interchangeably.

Unless otherwise indicated, the term "substituted" generally means that a hydrogen of the substituted species has been replaced with a different atom or group of atoms. For example, methyl-cyclopentadiene is cyclopentadiene that has been substituted with a methyl group. Likewise, picric acid can be described as phenol that has been substituted with three nitro groups, or, alternatively, as benzene that has been substituted with one hydroxy and three nitro groups.

The following abbreviations may be used herein: dme is 1,2-dimethoxyethane, Me is methyl, Et is ethyl, Pr is propyl, cPr is cyclopropyl, nPr is normal propyl, iPr is isopropyl, Bu is butyl, nBu is normal butyl, iBu is isobutyl, sBu is sec-butyl, tBu is tert-butyl, p-tBu is para-tert-butyl, Ph is phenyl, Bn is benzyl (i.e., $CH_2Ph$), Oct is octyl, Cy is cyclohexyl, TMS is trimethylsilyl, TIBAL is triisobutylaluminum, TNOAL is tri(n-octyl)aluminum, MAO is methylalumoxane, p-Me is para-methyl, THF (also referred to as thf) is tetrahydrofuran, RT is room temperature (and is 23° C. unless otherwise indicated), tol is toluene, and EtOAc is ethyl acetate.

An "anionic ligand" is a negatively charged ligand that donates one or more pairs of electrons to a metal ion. A "neutral donor ligand" is a neutrally charged ligand which donates one or more pairs of electrons to a metal ion.

As used herein, a "catalyst system" includes at least one catalyst compound and a support material. A catalyst system of the present disclosure can further include an activator and an optional co-activator. For the purposes of this disclosure and claims thereto, when a catalyst is described as comprising neutral stable forms of the components, it is well understood by one of ordinary skill in the art, that the ionic form of the component is the form that reacts with the monomers to produce polymers. Furthermore, catalysts of the present disclosure represented by a Formula are intended to embrace ionic forms thereof of the compounds in addition to the neutral stable forms of the compounds. Furthermore, activators of the present disclosure are intended to embrace ionic/reaction product forms thereof of the activator in addition to ionic or neutral form.

A scavenger is a compound that can be added to a reactor to facilitate polymerization by scavenging impurities. Some scavengers may also act as chain transfer agents. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound. Examples of scavengers include trialkylaluminums, methylalumoxanes, modified methylalumoxanes such as MMAO-3A (Akzo Nobel), bis(diisobutylaluminum)oxide (Akzo Nobel), tri(n-octyl) aluminum, triisobutylaluminum, and diisobutylaluminum hydride.

As used herein, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may include at least one aromatic group.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" refers to $C_1$-$C_{100}$ radicals, that may be linear, branched, or cyclic, and when cyclic, aromatic or non-aromatic. Examples of such radicals include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and their substituted analogues. Substituted analogues of hydrocarbyl radicals are radicals in which at least one hydrogen atom of the hydrocarbyl radical has been substituted with at least one halogen (such as Br, Cl, F or I) or at least one functional group such as C(O)R*, C(O)NR*$_2$, C(O)OR*, NR*$_2$, OR*, SeR*, TeR*, PR*$_2$, AsR*$_2$, SbR*$_2$, SR*, BR*$_2$, SiR*$_3$, GeR*$_3$, SnR*$_3$, and PbR*$_3$ (where R* is independently a hydrogen or hydrocarbyl radical, and two or more R* may join together to form a substituted or unsubstituted saturated, partially unsaturated or aromatic cyclic or polycyclic ring structure), or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals include ethenyl, propenyl, allyl, 1,4-butadienyl cyclopropenyl, cyclobutenyl, cyclopentenyl, cyclohexenyl, cyclootenyl, including their substituted analogues. Substituted analogues of alkenyl radicals are radicals in which at least one hydrogen atom of the alkenyl radical has been substituted with at least one halogen (such as Br, Cl, F or I) or at least one functional group such as C(O)R*, C(O)NR*$_2$, C(O)OR*, NR*$_2$, OR*, SeR*, TeR*, PR*$_2$, AsR*$_2$, SbR*$_2$, SR*, BR*$_2$, SiR*$_3$, GeR*$_3$, SnR*$_3$, and PbR*$_3$ (where R* is independently a hydrogen or alkenyl radical, and two or more R* may join together to form a substituted or unsubstituted saturated, partially unsaturated or aromatic cyclic or polycyclic ring structure), or where at least one heteroatom has been inserted within a ring.

The term "alkoxy" or "alkoxide" means an alkyl ether or aryl ether radical wherein the term alkyl is as defined above. Examples of suitable alkyl ether radicals include methoxy, ethoxy, n-propoxy, iso-propoxy, n-butoxy, iso-butoxy, sec-butoxy, tert-butoxy, and phenoxyl.

The term "aryl" or "aryl group" includes a $C_4$-$C_{20}$ aromatic ring, such as a six carbon aromatic ring, and the substituted variants thereof, including phenyl, 2-methylphenyl, xylyl, 4-bromo-xylyl. Likewise heteroaryl means an aryl group where a ring carbon atom (or two or three ring carbon atoms) has been replaced with a heteroatom, preferably N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, iso-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

For any particular compound disclosed herein, any general or specific structure presented also encompasses all conformational isomers, regioisomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom-substituted ring where a hydrogen on a ring atom is replaced with a heteroatom. For example, tetrahydrofuran is a heterocyclic ring and 4-N,N-dimethylamino-phenyl is a heteroatom-substituted ring.

As used herein the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The term "continuous" means a system that operates without interruption or cessation. For example a continuous process to produce a polymer would be one where the reactants are continually introduced into one or more reactors and polymer product is continually withdrawn during a polymerization process.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res., 2000, Vol. 29, p. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than about 25 wt % of inert solvent or diluent, preferably less than about 10 wt %, preferably less than about 1 wt %, preferably about 0 wt %.

As used herein the term "slurry polymerization process" means a polymerization process where a supported catalyst is employed and monomers are polymerized on the supported catalyst particles.

"Catalyst productivity" is a measure of how many grams of polymer (P) are produced using a polymerization catalyst comprising grams (W) of catalyst (cat), over a period of time of T hours; and may be expressed by the following formula: $P/(T \times W)$ and expressed in units of $gPgcat^{-1}\ h^{-1}$. "Conversion" is the amount of monomer that is converted to polymer product, and is reported as mol % and is calculated based on the polymer yield and the amount of monomer fed into the reactor. "Catalyst activity" is a measure of the level of activity of the catalyst and is reported as the mass of product polymer (P) produced per mole (or mmol) of catalyst (cat) used (kgP/molcat or gP/mmolCat), and catalyst activity can also be expressed per unit of time, for example, per hour (hr).

The term "pyridyldiamido complex" or "pyridyldiamide complex" or "pyridyldiamido catalyst" or "pyridyldiamide catalyst" refers to a class of coordination complexes described in U.S. Pat. No. 7,973,116 B2, U.S. Publication Nos. 2012/0071616 A1, 2011/0224391 A1, and 2011/0301310 A1 that feature a dianionic tridentate ligand that is coordinated to a metal center through one neutral Lewis basic donor atom (e.g., a pyridine group) and a pair of anionic amido or phosphido (i.e., deprotonated amine or phosphine) donors. In these complexes the pyridyldiamido ligand is coordinated to the metal with the formation of one five membered chelate ring and one seven membered chelate ring. It is possible for additional atoms of the pyridyldiamido ligand to be coordinated to the metal without affecting the catalyst function upon activation; an example of this could be a cyclometalated substituted aryl group that forms an additional bond to the metal center. Herein, "catalyst" and "catalyst complex" are used interchangeably.

The present disclosure relates to ethylene copolymers, more specifically to ethylene propylene copolymers, useful for viscosity modification applications.

The copolymers according to the present invention can be produced by a method comprising contacting ethylene and one or more $C_3$ to $C_{20}$ alpha-olefins with a catalyst system comprising an activator, a chain transfer agent, and a pyridyldiamido transition metal complex represented by the formula (A), (B), (C), or (D) (shown below); and obtaining a copolymer having an ethylene content of about 45 wt % to about 70 wt %. The copolymer can comprise an ethylene content of about 45 wt % to about 60 wt %. Alternatively, the copolymer can comprises an ethylene content of about 45 wt % to about 55 wt %. Alternatively, the copolymer can comprises an ethylene content of about 51 wt % to about 55 wt %.

Catalysts

The catalyst system comprises an activator, a chain transfer agent (which may be a material that can function as both a scavenger and a chain transfer agent, such as tri(n-octyl) aluminum) and a pyridyldiamido transition metal complex represented by the formula (A), (B), (C) or (D):

(A)

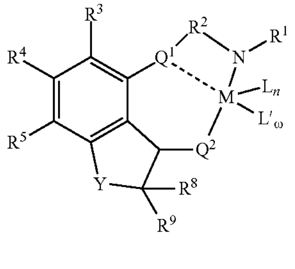

-continued (B)

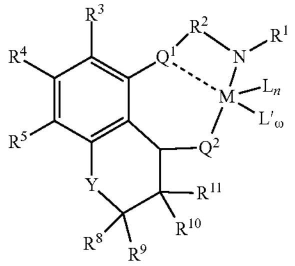

(C)

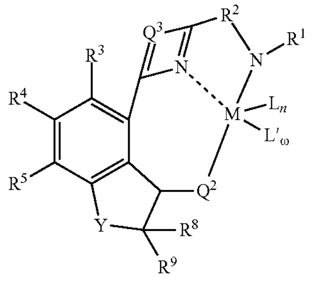

(D)

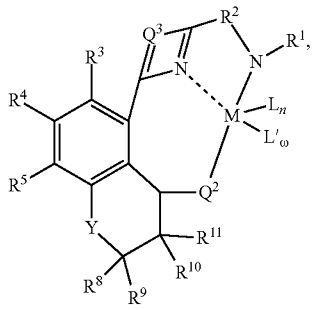

wherein:

M is a Group 3 or 4 metal;

$Q^1$ is a three atom bridge with the central of the three atoms being a group 15 or 16 element (said group 15 element may or may not be substituted with an $R^{30}$ group) represented by the formula: $-G^1-G^2-G^3-$ where $G^2$ is a group 15 or 16 atom (said group 15 element may be substituted with a $R^{30}$ group), $G^1$ and $G^3$ are each a group 14, 15 or 16 atom (each group 14, 15 and 16 element may or may not be substituted with one or more $R^{30}$ groups), where $G^1$, $G^2$ and $G^3$, or $G^1$ and $G^2$, or $G^1$ and $G^3$, or $G^2$ and $G^3$ may form a singular or multi ring system; each $R^{30}$ group is independently a hydrogen, a $C_1$ to $C_{100}$ hydrocarbyl radical, or a silyl radical;

$Q^2$ is $—NR^7$ or $—PR^7$, where $R^7$ is a hydrocarbyl radical, a substituted hydrocarbyl radical, a silyl radical, or a germyl radical;

$Q^3$ is -(TT)- or -(TTT)- where each T is carbon or a heteroatom, and said carbon or heteroatom may be unsubstituted or substituted with one or more $R^{30}$ groups that together with the "$—C-Q^3=C—$" fragment, forms a 5- or 6-membered cyclic group or a polycyclic group including the 5- or 6-membered cyclic group;

$R^1$ is a hydrocarbyl radical, a substituted hydrocarbyl radical, or a silyl radical; each of $R^3$, $R^4$, and $R^5$ is independently a hydrogen, a hydrocarbyl radical, a substituted hydrocarbyl radical, an alkoxy radical, an aryloxy radical, a halogen, an amino radical, or a silyl radical, or two or more adjacent $R^3$, $R^4$, and $R^5$ groups may independently join together to form a substituted or unsubstituted hydrocarbyl ring or heterocyclic ring, where the ring has 5, 6, 7, or 8 ring atoms and where substitutions on the ring can join to form additional rings;

$R^2$ is $-E(R^{12})(R^{13})—$ where E is carbon, silicon, or germanium;

Y is oxygen, sulfur, or $-E^*(R^6)(R^7)—$, wherein E* is carbon, silicon, or germanium; each of $R^6$, $R^7$, $R^8$, $R^9$, $R^{10}$, $R^{11}$, $R^{12}$, and $R^{13}$ is independently a hydrogen, a hydrocarbyl radical, a substituted hydrocarbyl radical, an aryl radical, a substituted aryl radical, an alkoxy radical, a halogen, an amino radical, or a silyl radical, or two or more adjacent $R^6$, $R^7$, $R^8$, $R^9$, $R^{10}$, $R^{11}$, $R^{12}$, and $R^{13}$ groups may independently join together to form a saturated, substituted or unsubstituted hydrocarbyl ring or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group;

n is 1 or 2;

L' is neutral Lewis base; and w is 0, 1, 2, 3 or 4;

Pyridyldiamido Transition Metal Complex

Pyridyldiamido transition metal complexes include those represented by the general formula (A), (B), (C), or (D):

(A)

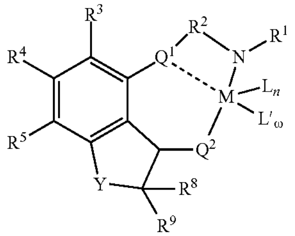

(B)

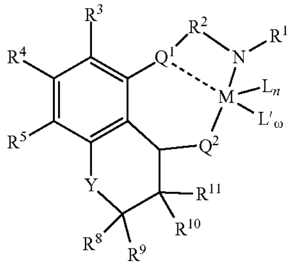

(C)

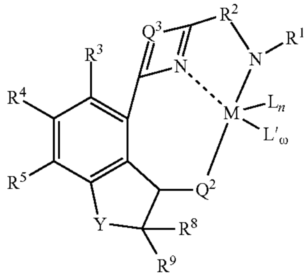

-continued (D)

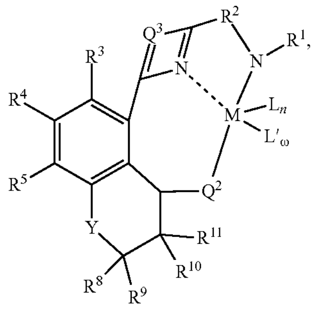

wherein:

M is a Group 3 or 4 metal (preferably a Group 4 metal, more preferably Ti, Zr, or Hf);

$Q^1$ is a three atom bridge with the central of the three atoms being a Group 15 or 16 element (said Group 15 element may or may not be substituted with an $R^{30}$ group) that preferably forms a dative bond to M, more preferably represented by the formula: $-G^1-G^2-G^3-$ where $G^2$ is a Group 15 or 16 atom (said Group 15 element may be substituted with a $R^{30}$ group), $G^1$ and $G^3$ are each a Group 14, 15 or 16 atom (each Group 14, 15 and 16 element may or may not be substituted with one or more $R^{30}$ groups), where $G^1$, $G^2$ and $G^3$, or $G^1$ and $G^2$, or $G^1$ and $G^3$, or $G^2$ and $G^3$ may form a singular or multi ring system, where each $R^{30}$ group is independently a hydrogen, a $C_1$ to $C_{100}$ hydrocarbyl radical, or a silyl radical;

$Q^2$ is —$NR^7$ or —$PR^7$, where $R^7$ is a hydrocarbyl radical, a substituted hydrocarbyl radical, a silyl radical, or a germyl radical;

$Q^3$ is -(TT)- or -(TTT)- where each T is carbon or a heteroatom (preferably C, O, S, or N), and said carbon or heteroatom may be unsubstituted or substituted with one or more $R^{30}$ groups that together with the "—C-$Q^3$═C—" fragment, forms a 5- or 6-membered cyclic group or a polycyclic group including the 5- or 6-membered cyclic group;

$R^1$ is a hydrocarbyl radical, a substituted hydrocarbyl radical, or a silyl radical; each of $R^3$, $R^4$, and $R^5$ is independently a hydrogen, a hydrocarbyl radical, a substituted hydrocarbyl radical, an aryl radical, a substituted aryl radical, an alkoxy radical, an aryloxy radical, a halogen, an amino radical, or a silyl radical, or two or more adjacent $R^3$, $R^4$, and $R^5$ groups may independently join together to form a substituted or unsubstituted hydrocarbyl ring or heterocyclic ring, where the ring has 5, 6, 7, or 8 ring atoms and where substitutions on the ring can join to form additional rings;

$R^2$ is -$E(R^{12})(R^{13})$— where E is carbon, silicon, or germanium (preferably carbon or silicon, more preferably carbon) and $R^{12}$ and $R^{13}$ as described herein;

Y is oxygen, sulfur, or -$E^*(R^6)(R^7)$—, wherein E* is carbon, silicon, or germanium (preferably carbon or silicon, more preferably carbon) and $R^6$ and $R^7$ as described herein;

each of $R^6$, $R^7$, $R^8$, $R^9$, $R^{10}$, $R^{11}$, $R^{12}$, and $R^{13}$ is independently a hydrogen, a hydrocarbyl radical, a substituted hydrocarbyl radical, an alkoxy radical, a halogen, an amino radical, or a silyl radical, or two or more adjacent $R^6$, $R^7$, $R^8$, $R^9$, $R^{10}$, $R^{11}$, $R^{12}$, and $R^{13}$ groups may independently join together to form a saturated, substituted or unsubstituted hydrocarbyl ring or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group;

n is 1 or 2 (preferably 2);

L' is neutral Lewis base; and w is 0, 1, 2, 3 or 4 (preferably 0 or 1

In some embodiments, $Q^1$ is:

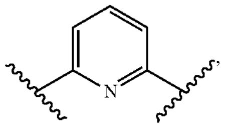
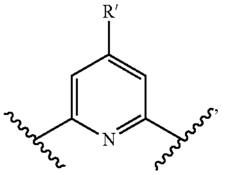
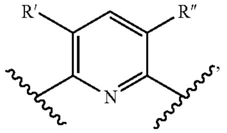
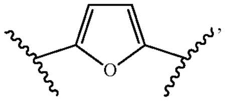
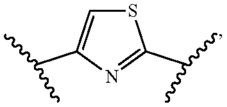
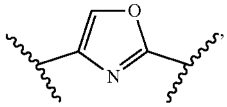
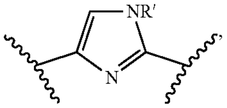
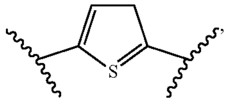 or
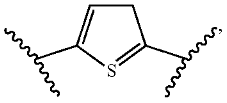

wherein:

the indicates the connections to $R^2$ and the aromatic ring, and each of R' and R' is an alkyl group, such as a $C_1$ to $C_{20}$ alkyl group, such as methyl, ethyl, propyl, butyl, pentyl, hexyl, heptyl, octyl, nonyl, decyl, undecyl, and dodecyl.

In some embodiments, each L is independently a halide, alkyl, aryl, alkoxy, amido, hydrido, phenoxy, hydroxy, silyl, allyl, alkenyl, triflate, alkylsulfonate, arylsulfonate, or alkynyl and/or each L' is independently an ether, thio-ether, amine, nitrile, imine, pyridine, or phosphine.

In some embodiments, $G^1$ is carbon, nitrogen, oxygen, silicon, or sulfur, preferably carbon.

In some embodiments, $G^2$ is nitrogen, phosphorous, oxygen, sulfur, or selenium, preferably nitrogen, oxygen, or sulfur.

In some embodiments, $G^3$ is carbon, nitrogen, oxygen, silicon, or sulfur, preferably carbon.

In some embodiments, $Q^2$ is —$NR^{17}$, —$PR^{17}$, or oxygen, preferably —$NR^{17}$.

In some embodiments, $Q^3$ is CHCHCH, CHCH, CHN(R'), CH—S, CHC(R')CH, C(R')CHC(R"), CH—O, NO, preferably CHCHCH, CHCH, CHN(R'), CHN(Me), CH—S, more preferably the R' is a $C_1$ to $C_{20}$ hydrocarbyl, such as methyl, ethyl, propyl, butyl, pentyl, hexyl, heptyl, octyl, nonyl, decyl, undecyl, or dodecyl.

In some embodiments, $R^1$ is a hydrocarbyl, substituted hydrocarbyls, or silyl radical (preferably alkyl, aryl, heteroaryl, and silyl groups, preferably methyl, ethyl, propyl, butyl, pentyl, hexyl, heptyl, octyl, nonyl, decyl, undecyl, dodecyl, phenyl, substituted phenyl, 2,6-disubstitutedphenyl, 2,6-diisopropylphenyl, 2,4-6-trisubstituted aryl, 2,4,6-triisopropylphenyl, and isomers thereof, including cyclohexyl).

In some embodiments, $R^{17}$ is a hydrogen, hydrocarbyl, substituted hydrocarbyl, silyl, or germyl group (preferably alkyl, aryl, heteroaryl, and silyl groups, preferably methyl, ethyl, propyl, butyl, pentyl, hexyl, heptyl, octyl, nonyl, decyl, undecyl, dodecyl, cycloalkyl, cyclooctyl, cyclododecyl, phenyl, substituted phenyl, 2-substituted phenyl, ortho-tolyl, 2,6-disubstitutedphenyl, or isomers thereof, including cyclohexyl).

In some embodiments, each $R^{30}$ group is a hydrogen, a $C_1$ to $C_{100}$ hydrocarbyl radical, or a silyl radical (preferably alkyl, aryl, and silyl groups, more preferably methyl, ethyl, propyl, butyl, pentyl, hexyl, heptyl, octyl, nonyl, decyl, undecyl, dodecyl, phenyl, or isomers thereof, including cyclohexyl).

In some embodiments, $R^2$ contains 1 to 20 carbons, preferably $R^2$ is $CH_2$, CH(aryl), CH(2-isopropylphenyl), CH(2,6-dimethylphenyl), CH(2,4-6-trimethylphenyl), CH(alkyl), $CMe_2$, $SiMe_2$, $SiEt_2$, or $SiPh_2$.

In some embodiments, each of E and E* are, independently, carbon, silicon, or germanium (preferably carbon or silicon, more preferably carbon). In a preferred embodiment, E and E* are both carbon.

In some embodiments, each of $R^{12}$, $R^{13}$, $R^6$, and $R^7$ independently a hydrogen, a hydrocarbyl radical, a substituted hydrocarbyl radical, an aryl radical, a substituted aryl radical, an alkoxy radical, a halogen, an amino radical, or phosphino, or $R^{12}$ and $R^{13}$ and/or $R^6$ and $R^7$ may be joined to form a saturated, substituted or unsubstituted hydrocarbyl ring, where the ring has 4, 5, 6, 7, or 8 ring carbon atoms and where substitutions on the ring can join to form additional rings, or $R^{12}$ and $R^{13}$ and/or $R^6$ and $R^7$ may be joined to form a saturated heterocyclic ring, or a saturated substituted heterocyclic ring where substitutions on the ring can join to form additional rings.

In some embodiments, at least one of $R^{12}$ and $R^{13}$ is a $C_1$ to $C_{100}$ (preferably $C_6$ to $C_{40}$, more preferably $C_7$ to $C_{30}$, even more preferably $C_8$ to $C_{20}$) substituted or unsubstituted hydrocarbyl group (preferably aryl, phenyl, substituted phenyl, alkyl or aryl substituted phenyl, $C_2$ to $C_{30}$ alkyl or aryl substituted phenyl, 2-substituted phenyl, 2-isopropylphenyl, or 2,4,6-trimethylphenyl).

In some embodiments, at least one of $R^6$ and $R^7$ is a $C_1$ to $C_{100}$ (preferably $C_6$ to $C_{40}$, more preferably $C_7$ to $C_{30}$, even more preferably $C_8$ to $C_{20}$) substituted or unsubstituted hydrocarbyl group (preferably aryl, phenyl, substituted phenyl, alkyl or aryl substituted phenyl, $C_2$ to $C_{30}$ alkyl or aryl substituted phenyl, 2-substituted phenyl, 2-isopropylphenyl, or 2,4,6-trimethylphenyl).

In some embodiments, each of $R^3$, $R^4$, and $R^5$ is independently a hydrogen, a hydrocarbyl radical, a substituted hydrocarbyl radical, an alkoxy radical, an aryloxy radical, a halogen, an amino radical, or a silyl radical, or two or more adjacent $R^3$, $R^4$, and $R^5$ groups may independently join together to form a substituted or unsubstituted hydrocarbyl ring or heterocyclic ring, where the ring has 5, 6, 7, or 8 ring atoms and where substitutions on the ring can join to form additional rings. Preferably, each of $R^3$, $R^4$, and $R^5$ is independently a hydrogen, methyl, ethyl, propyl, butyl, pentyl, hexyl, heptyl, octyl, nonyl, decyl, undecyl, dodecyl, phenyl, substituted phenyl, or isomers thereof.

In some embodiments, each of $R^8$, $R^9$, $R^{10}$, and $R^{11}$ is independently a hydrogen, a hydrocarbyl radical, a substituted hydrocarbyl radical, an aryl radical, a substituted aryl radical, an alkoxy radical, a halogen, an amino radical, or a silyl radical, or two or more adjacent $R^5$, $R^9$, $R^{10}$, and $R^{11}$ groups may independently join together to form a saturated, substituted or unsubstituted hydrocarbyl ring or heterocyclic ring, where the ring has 5, 6, 7, or 8 ring carbon atoms and where substitutions on the ring can join to form additional rings. Preferably, each of $R^8$, $R^9$, $R^{10}$, and $R^{11}$ is independently hydrogen, methyl, ethyl, propyl, butyl, pentyl, hexyl, heptyl, octyl, nonyl, decyl, undecyl, dodecyl, phenyl, substituted phenyl, or isomers thereof.

Preferably, any of the R groups above and other R groups mentioned hereafter, contain up to 30 carbon atoms, preferably no more than 30 carbon atoms, especially from 2 to 20 carbon atoms.

Preferably, M is Ti, Zr, or Hf and/or E and/or E* is carbon, with Zr or Hf based complexes being especially preferred.

In some embodiments, $R^1$ and $R^{17}$ are phenyl groups that are variously substituted with between zero to five substituents that include F, Cl, Br, I, $CF_3$, $NO_2$, alkoxy, dialkylamino, aryl, and alkyl groups with between one to ten carbons.

In some embodiments, each L may be a halide, alkyl, aryl, alkoxy, amido, hydrido, phenoxy, hydroxy, silyl, allyl, alkenyl, triflate, alkylsulfonate, arylsulfonate, and alkynyl. The selection of the leaving groups depends on the synthesis route adopted for arriving at the complex and may be changed by additional reactions to suit the later activation method in polymerization. For example, alkyl is preferred when using non-coordinating anions such as N,N-dimethylanilinium tetrakis(pentafluorophenyl)borate or tris(pentafluorophenyl)borane.

In some embodiments, two L groups may be linked to form a dianionic leaving group, for example, oxalate.

In some embodiments, each L' is independently an ether, thio-ether, amine, nitrile, imine, pyridine, or phosphine, preferably ethers.

In some embodiments, M is preferably a Group 4 metal, more preferably Zr or Hf.

In some embodiments, E and/or E* is preferably carbon.

Preferably, in some embodiments, $R^6$ and $R^7$ are the same.

In some embodiments, $R^1$, $R^3$, $R^4$, $R^8$, and $R^7$ may each contain no more than 30 carbon atoms.

In some embodiments, E is carbon, and each of $R^1$ and $R^{17}$ is independently a phenyl group that is substituted with 0, 1, 2, 3, 4, or 5 substituents, the substituents comprising F, Cl, Br, I, $CF_3$, $NO_2$, alkoxy, dialkylamino, hydrocarbyl, and substituted hydrocarbyl groups with from one to ten carbons.

In a preferred embodiment, the pyridyldiamido transition metal complex is represented by the formula (A) above and at least one of $R^6$ and $R^7$ is a group containing from 1 to 100 (preferably 6 to 40, more preferably 7 to 30) carbons.

In a preferred embodiment, the pyridyldiamido transition metal complex is represented by the formula (A) above, and M is a Group 4 metal preferably Zr or Hf, more preferably Hf.

In a preferred embodiment, the pyridyldiamido transition metal complex is represented by the formula (B) above, and M is a Group 4 metal preferably Zr or Hf, more preferably Hf.

In a preferred embodiment, the pyridyldiamido transition metal complex is represented by the formula (A) above, and $G^2$ is oxygen, and $G^1$ and $G^3$ are carbon atoms that are joined to each other by two to six additional atoms to form a cyclic structure.

In a preferred embodiment, the pyridyldiamido transition metal complex is represented by the formula (B) above, and $G^2$ is oxygen, and $G^1$ and $G^3$ are carbon atoms that are joined to each other by two to six additional atoms to form a cyclic structure.

In a preferred embodiment, the pyridyldiamido transition metal complex is represented by the formula (A) above, and $G^2$ is nitrogen, and $G^1$ and $G^3$ are carbon atoms that are joined to each other by two to six additional atoms to form a cyclic structure.

In a preferred embodiment, the pyridyldiamido transition metal complex is represented by the formula (B) above, and $G^2$ is nitrogen, and $G^1$ and $G^3$ are carbon atoms that are joined to each other by two to six additional atoms to form a cyclic structure.

In a preferred embodiment, the pyridyldiamido transition metal complex is represented by the formula (A) above, and $G^2$ is sulfur, and $G^1$ and $G^3$ are carbon atoms that are joined to each other by two to six additional atoms to form a cyclic structure.

In a preferred embodiment, the pyridyldiamido transition metal complex is represented by the formula (B) above, and $G^2$ is sulfur, and $G^1$ and $G^3$ are carbon atoms that are joined to each other by two to six additional atoms to form a cyclic structure.

In a preferred embodiment, the pyridyldiamido transition metal complex is represented by the formula (C) above, and $Q^3$ is C(H)C(H)C(H), $R^1$ is 2,6-diisopropylphenyl, and $R^7$ is phenyl.

In a preferred embodiment, the pyridyldiamido transition metal complex is represented by the formula (D) above, $R^6$ is H, $R^7$ is a group containing between 1 to 100 (preferably 6 to 40, more preferably 7 to 30) carbons, M is a Group 4 metal (preferably Zr or Hf, more preferably Hf), and E is carbon.

In a preferred embodiment, the pyridyldiamido transition metal complex is represented by the formula (A) above, and $R^1$ is a 2,6-disubstituted aryl group where the substituents are selected from isopropyl, 3-pentyl, or cyclic aliphatic hydrocarbons containing between 4-20 carbons.

In a preferred embodiment, the pyridyldiamido transition metal complex is represented by the formula (A) above, and $Q^1$ is three atoms of a pyridine, imidazole, tetrahydrofuran, dioxane, dihydrothiazole, oxathiolane, tetrahydropyran, dihydrooxazole, or phosphinine group that is substituted at the adjacent positions.

In a preferred embodiment, the pyridyldiamido transition metal complex is represented by the formula (A) above, and $R^2$ is CH(aryl) with the aryl group containing between 7 and 20 carbon atoms.

In a preferred embodiment, the pyridyldiamido transition metal complex is one or more of the compounds represented by the formula (1), (2), and (3):

(1)

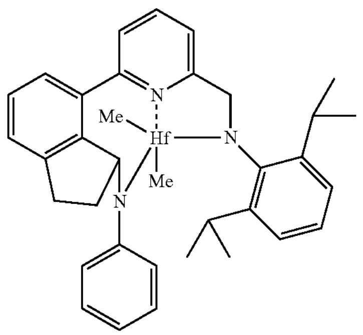

-continued (2)

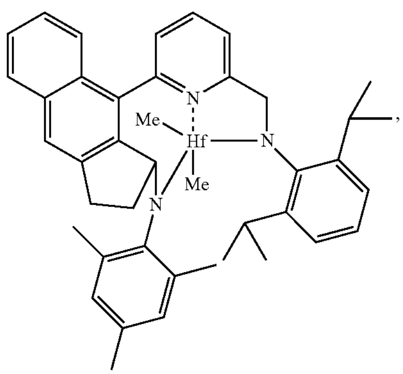

, and (3)

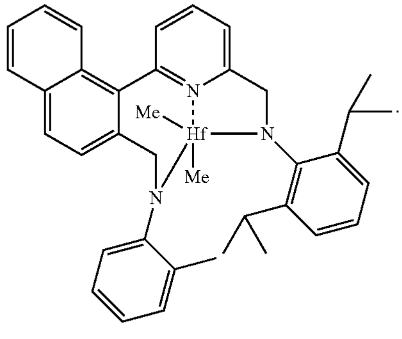

.

The pyridyl diamine ligands described herein are generally prepared in multiple steps. One key step involves the preparation of a suitable "linker" group(s) containing both an aryl boronic acid (or acid ester) and an amine group. Examples of these include compounds of the general formula: 7-(boronic acid)-2,3-dihydro-1H-inden-1-(amine), 7-(boronic acid ester)-2,3-dihydro-1H-1-(amine), 7-(boronic acid)-1,2,3,4-tetrahydronaphthalen-1-(amine), 7-(boronic acid ester)-1,2,3,4-tetrahydronaphthalen-1-(amine), which include various boronic acids, boronic acid esters, and amines. The linker groups may be prepared in high yield from arylhalide precursors containing amine functionality by first deprotonation of the amine group with 1.0 molar equivalents of n-BuLi, followed by transmetalation of an arylhalide with t-BuLi and subsequent reaction with a boron-containing reagent. This amine-containing linker is then coupled with a suitable pyridine containing species, such as 6-bromo-2-pyridinecarboxaldehyde. This coupling step typically uses a metal catalyst (e.g., $Pd(PPh_3)_4$) in less than 5 mol % loading. Following this coupling step, the new derivative, which can be described as amine-linker-pyridine-aldehyde, is then reacted with a second amine to produce the imine derivative amine-linker-pyridine-imine in a condensation reaction. This can then be reduced to the pyridyl diamine ligand by reaction with a suitable aryl anion, alkyl anion, or hydride source. This reaction is generally performed in etherial solvents at temperatures between about −100° C. and about 50° C. when aryllithium or alkyllithium reagents are employed. This reaction is generally performed in methanol at reflux when sodium cyanoborohydride is employed.

The preparation of pyridyl diamide metal complexes from pyridyl diamines may be accomplished using typical protonolysis and methylation reactions. In the protonolysis reaction, the pyridyl diamine is reacted with a suitable metal reactant to produce a pyridyldiamide metal complex. A suitable metal reactant will feature a basic leaving group that will accept a proton from the pyridiyl diamine and then generally depart and be removed from the product. Suitable metal reactants include, but are not limited to, $HfBn_4$ ($Bn=CH_2Ph$), $ZrBn_4$, $TiBn_4$, $ZrBn_2Cl_2(OEt_2)$, $HfBn_2Cl_2(OEt_2)_2$, $Zr(NMe_2)_2Cl_2$(dimethoxyethane), $Hf(NMe_2)_2Cl_2$(dimethoxyethane), $Hf(NMe_2)_4$, and $Hf(NEt_2)_4$. Pyridyldiamide metal complexes that contain metal-chloride groups, such as the PDA dichloride complex in Scheme 1 below, can be alkylated by reaction with an appropriate organometallic reagent. Suitable reagents include organolithium and organomagnesium, and Grignard reagents. The alkylations are generally performed in etherial or hydrocarbon solvents or solvent mixtures at temperatures typically ranging from about −100° C. to about 50° C.

Scheme 1

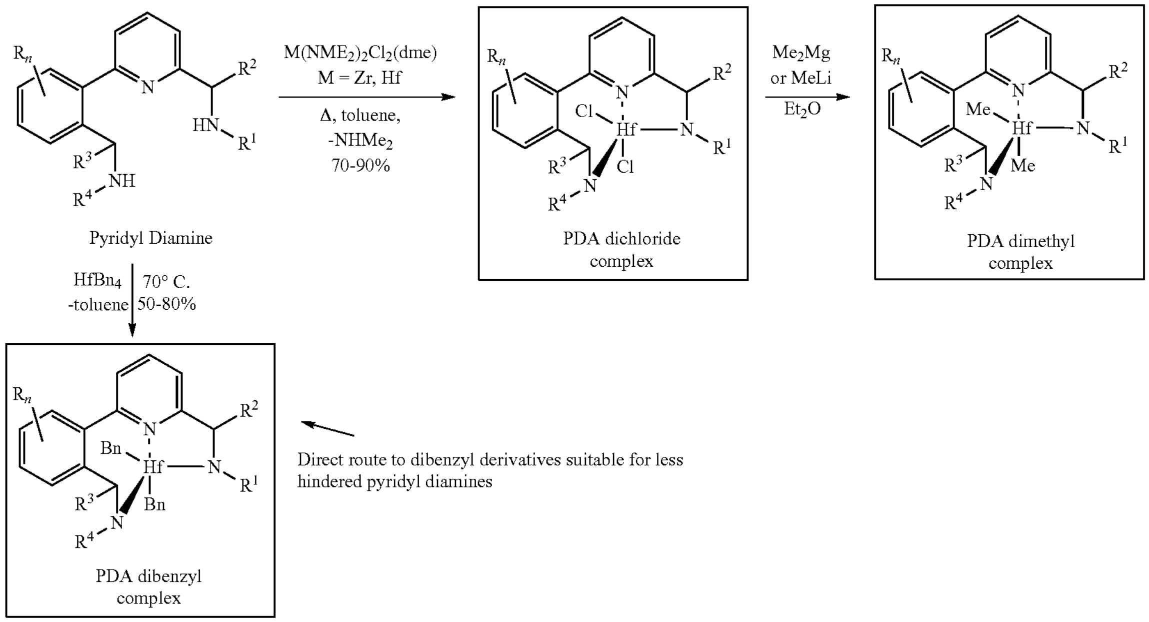

In Scheme 1, each of R, $R^1$, $R^2$, $R^3$, $R^4$ is independently a hydrogen, a hydrocarbyl radical (such as alkyl radical and aryl radical), substituted hydrocarbyl radicals (such as heteroaryls), or silyl radical, and $R_n$ indicates a hydrogen, a hydrocarbyl radical, or substituted hydrocarbyl radical, which may be joined to form a polycyclic aromatic ring and n is 1, 2, 3, or 4.

Another route to pyridyl diamide and other complexes of interest as catalysts involves the insertion of an unsaturated molecule into a covalent metal-carbon bond where the covalently bonded group is part of a multidentate ligand structure, such as that described by Boussie et al. in U.S. Pat. No. 6,750,345. The unsaturated molecule will generally have a carbon-X double or triple bond where X is a Group 14 or Group 15 or Group 16 element. Examples of unsaturated molecules include alkenes, alkynes, imines, nitriles, ketones, aldehydes, amides, formamides, carbon dioxide, isocyanates, thioisocyanates, and carbodiimides. Examples showing the insertion reactions involving benzophenone and N,N-dimethylformamide are below.

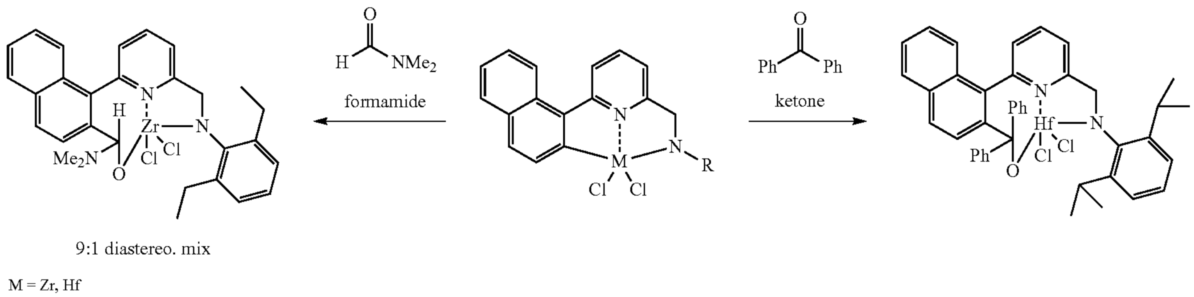

Chain Transfer Agents (CTAs)

A "chain transfer agent" is any agent capable of hydrocarbyl and/or polymeryl group exchange between a coordinative polymerization catalyst and the metal center of the chain transfer agent during a polymerization process. The chain transfer agent can be any desirable chemical compound such as those disclosed in International Publication No. WO 2007/130306. Preferably, the chain transfer agent is a Group 2, 12, or 13 alkyl or aryl compounds; preferably zinc, magnesium or aluminum alkyls or aryls; preferably where the alkyl is a $C_1$ to $C_{30}$ alkyl, alternately a $C_2$ to $C_{20}$ alkyl, alternately a $C_3$ to $C_{12}$ alkyl, typically and independently methyl, ethyl, propyl, butyl, iso-butyl, tert-butyl, pentyl, hexyl, cyclohexyl, phenyl, octyl, nonyl, decyl, undecyl, dodecyl, or isomers and analogs thereof.

Useful chain transfer agents are typically alkylalumoxanes, a compound represented by the formula $AlR_3$, $ZnR_2$ (where each R is, independently, a $C_1$ to $C_8$ aliphatic radical, preferably methyl, ethyl, propyl, butyl, pentyl, hexyl octyl or an isomer thereof), or a combination thereof, such as diethyl zinc, methylalumoxane, trimethylaluminum, triisobutylaluminum, trioctylaluminum, or a combination thereof.

Preferred agents, for use in the synthesizing the copolymers employed according to the present disclosure, are trialkyl aluminum compounds and dialkyl zinc compounds having from 1 to 8 carbons in each alkyl group, such as triethylaluminum (TEAL), tri(i-propyl) aluminum, tri(i-butyl) aluminum (TIBAL), tri(n-hexyl)aluminum, tri(n-octyl)aluminum (TNOAL), diethyl zinc, diisobutyl zinc, di(n-propyl)zinc, dioctyl zinc. Mixtures of chain transfer agents may also be used. Most preferred agents are diethyl zinc and tri(n-octyl) aluminum.

In a preferred embodiment, one or more triakyl aluminum compounds and one or more dialkyl zinc compounds (where the alkyl is preferably a $C_1$ to $C_{40}$ alkyl group, more preferably a $C_2$ to $C_{20}$ alkyl group, even more preferably a $C_2$ to $C_{12}$ alkyl group, especially preferably a $C_2$ to $C_8$ group, such as methyl, ethyl, propyl (including isopropyl and n-propyl), butyl (including n-butyl, sec-butyl and iso-butyl) pentyl, hexyl, heptyl, octyl, and isomers or analogs thereof are used as the CTA. Preferred combinations include TEAL, TIBAL, and/or TNOAL with $Et_2Zn$, preferably TEAL and $Et_2Zn$, or TIBAL and $Et_2Zn$, or TNOAL and $Et_2Zn$. Preferably, the trialkyl aluminum and dialkyl zinc compounds are present in the reaction at a molar ratio of Al to Zn of 1:1 or more, preferably 2:1 or more, preferably 5:1 or more, preferably 10:1 or more, preferably 15:1 or more preferably from 1:1 to 10,000:1.

Additional suitable chain transfer agents include the reaction product or mixture formed by combining the trialkylaluminum or dialkylzinc compound, preferably a tri($C_1$ to $C_8$)alkylaluminum or di($C_1$ to $C_8$)alkylzinc compound, with less than a stoichiometric quantity (relative to the number of hydrocarbyl groups) of a secondary amine or a hydroxyl compound, especially bis(trimethylsilyl)amine, t-butyl(dimethyl)siloxane, 2-hydroxymethylpyridine, di(n-pentyl) amine, 2,6-di(t-butyl)phenol, ethyl(1-naphthyl)amine, bis(2,3,6,7-dibenzo-1-azacycloheptaneamine), or 2,6-diphenylphenol. Desirably, sufficient amine or hydroxyl reagent is used such that one hydrocarbyl group remains per metal atom. The primary reaction products of the foregoing combinations useful in the present disclosure as chain transfer agents include n-octylaluminum di(bis(trimethylsilyl) amide), i-propylaluminumbis(dimethyl(t-butyl)siloxide), and n-octylaluminum di(pyridinyl-2-methoxide), i-butylaluminum bis(dimethyl(t-butyl)siloxane), i-butylaluminum bis (di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis (dimethyl(t-butyl)siloxide), ethylzinc(2,6-diphenylphenoxide), and ethylzinc(t-butoxide).

The chain transfer agent(s) are typically present in the reaction at a molar ratio of metal of the chain transfer agent to transition metal (from the pyridyldiamido transition metal complex) of about 5:1 or more, preferably from about 10:1 to 2000:1, preferably from about 20:1 to about 1000:1, preferably from about 25:1 to about 800:1, preferably from about 50:1 to about 700:1, and preferably from about 100:1 to about 600:1.

In an embodiment, the CTA is di-alkyl zinc, where the alkyl is a $C_1$ to $C_{20}$ alkyl group, such as methyl, ethyl, propyl, butyl, preferably the CTA is diethylzinc.

Activators

The terms "cocatalyst" and "activator" are used herein interchangeably and are defined to be any compound which can activate any one of the catalyst compounds described above by converting the neutral catalyst compound to a catalytically active catalyst compound cation.

After the complexes have been synthesized, catalyst systems may be formed by combining the complexes with activators in any suitable manner including by supporting them for use in slurry or gas phase polymerization. The catalyst systems may also be added to or generated in solution polymerization or bulk polymerization (in the monomer). The catalyst system typically includes a complex as described above and an activator such as alumoxane or a non-coordinating anion.

Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane Activators

In an embodiment, alumoxane activators are utilized as an activator in the catalyst system. The alumoxane may be used with another activator. Alumoxanes are generally oligomeric compounds containing $—Al(R^1)—O—$ sub-units, where $R^1$ is an alkyl group. Examples of alumoxanes include methylalumoxane (MAO), modified methylalumoxane (MMAO), ethylalumoxane, and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Another useful alumoxane is solid polymethylaluminoxane as described in U.S. Pat. Nos. 9,340,630; 8,404,880; and 8,975,209.

When the activator is an alumoxane (modified or unmodified), some embodiments include the maximum amount of activator typically at up to about a 5000-fold molar excess Al/M over the catalyst compound (per metal catalytic site). The minimum activator-to-catalyst-compound is about a 1:1 molar ratio. Alternate preferred ranges include from about 1:1 to about 500:1, alternately from about 1:1 to about 200:1, alternately from about 1:1 to about 100:1, or alternately from about 1:1 to about 50:1. In an alternate embodiment, little or no alumoxane is used in the polymerization processes described herein. Preferably, alumoxane is present at about zero mole %, alternately the alumoxane is present at a molar ratio of aluminum to catalyst compound transition metal less than about 500:1, preferably less than about 300:1, more preferably less than about 100:1, and even more preferably less than about 20:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include aluminum, gold, and platinum. Suitable metalloids include boron, aluminum, phosphorus, and silicon.

"Compatible" non-coordinating anions can be those which are not degraded to neutrality when the initially formed complex decomposes, and the anion does not transfer an anionic substituent or fragment to the cation so as to cause it to form a neutral transition metal compound and a neutral by-product from the anion. Non-coordinating anions useful in accordance with this present disclosure are those that are compatible, stabilize the transition metal cation in the sense of balancing its ionic charge at +1, and yet retain sufficient lability to permit displacement during polymerization.

It is within the scope of synthesizing the copolymers employed in the present disclosure to use an ionizing activator, neutral or ionic, such as tri(n-butyl) ammonium tetrakis(pentafluorophenyl)borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of the present disclosure to use neutral or ionic activators alone or in combination with alumoxane or modified alumoxane activators.

The catalyst systems can include at least one non-coordinating anion (NCA) activator.

In a preferred embodiment, boron containing NCA activators represented by the formula below can be used:

$$Z_d^+(A^{d-})$$

where: Z is (L-H) or a reducible Lewis acid; L is a neutral Lewis base; H is hydrogen; $(L\text{-}H)^+$ is a Brønsted acid; $A^{d-}$ is a non-coordinating anion, for example a boron containing non-coordinating anion having the charge d−; and d is 1, 2, or 3.

The cation component, $Z_d^+$ may include Brønsted acids such as protons or protonated Lewis bases or reducible Lewis acids capable of protonating or abstracting a moiety, such as an alkyl or aryl, from the bulky ligand containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably $Z_d^+$ is triphenyl carbonium. Preferred reducible Lewis acids can be any triaryl carbonium (where the aryl can be substituted or unsubstituted, such as those represented by the formula: $(Ar_3C^+)$, where Ar is aryl substituted with a $C_1$ to $C_{40}$ hydrocarbyl or with a substituted $C_1$ to $C_{40}$ hydrocarbyl, or a heteroaryl substituted with a $C_1$ to $C_{40}$ hydrocarbyl, or with a substituted $C_1$ to $C_{40}$ hydrocarbyl; preferably the reducible Lewis acids in "Z" include those represented by the formula: $(Ph_3C)$, where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation $(L\text{-}H)_d^+$, it is preferably a Brønsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d+}$ also include diboron compounds as disclosed in U.S. Pat. No. 5,447,895, which is fully incorporated herein by reference.

Examples of boron compounds which may be used as an activating cocatalyst include the compounds described as (and particularly those specifically listed as) activators in U.S. Pat. No. 8,658,556, which is incorporated by reference herein.

Bulky activators are also useful herein as NCAs. "Bulky activator" as used herein refers to anionic activators represented by the formula:

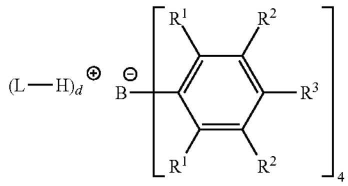

or

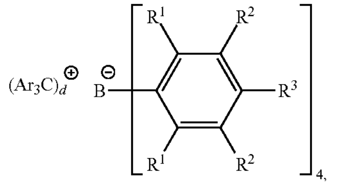

wherein:

each $R^1$ is, independently, a halide, preferably a fluoride,

Ar is a substituted or unsubstituted aryl group (preferably a substituted or unsubstituted phenyl), preferably substituted with $C_1$ to $C_{40}$ hydrocarbyls, and more preferably $C_1$ to $C_{20}$ alkyls or aromatics, each $R^2$ is, independently, a halide, a $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group (preferably $R^2$ is a fluoride or a perfluorinated phenyl group), each $R^3$ is a halide, $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group (preferably $R^3$ is a fluoride or a $C_6$ perfluorinated aromatic hydrocarbyl group); wherein $R^2$ and $R^3$ can form one or more saturated or unsaturated, substituted or unsubstituted rings (preferably $R^2$ and $R^3$ form a perfluorinated phenyl ring), and L is a neutral Lewis base; $(L-H)^+$ is a Brønsted acid; d is 1, 2, or 3, wherein the anion has a molecular weight of greater than 1020 g/mol, and wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

TABLE A

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators as described in U.S. Pat. No. 8,658,556, which is incorporated by reference herein.

In at least one embodiment, one or more of the NCA activators is chosen from the activators described in U.S. Pat. No. 6,211,105.

Preferred activators include N,N-dimethylanilinium tetrakis(perfluoronaphthyl)borate, N,N-dimethylanilinium tetrakis(perfluorophenyl)borate, triphenylcarbenium tetrakis (perfluorophenyl)borate, $[Ph_3C^+][B(C_6F_5)4^-]$, $[Me_3NH^+][B(C_6F_5)4^-]$, 1-(4-(tris(pentafluorophenyl)borate)-2,3,5,6-tetrafluorophenyl)pyrrolidinium, 4-(tris(pentafluorophenyl) borate)-2,3,5,6-tetrafluoropyridine.

In a preferred embodiment, the activator includes a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate.

In at least one embodiment, the activator includes one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, iso-butyl, or t-butyl).

Most preferably, the ionic activator $Z_d^+$ $(A^{d-})$ is one or more of N,N-dimethylanilinium tetrakis(perfluorophenyl) borate, N,N-dimethylanilinium tetrakis(perfluoronaphthyl) borate, N,N-dimethylanilinium tetrakis(perfluorobiphenyl) borate, N,N-dimethylanilinium tetrakis(3,5-bis (trifluoromethyl)phenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate, triphenylcarbenium tetra (perfluorophenyl)borate, trimethylammonium tetrakis (perfluoronaphthyl)borate, triethylammonium tetrakis (perfluoronaphthyl)borate, tripropylammonium tetrakis (perfluoronaphthyl)borate, tri(n-butyl)ammonium tetrakis (perfluoronaphthyl)borate, tri(t-butyl)ammonium tetrakis (perfluoronaphthyl)borate, N,N-diethylanilinium tetrakis (perfluoronaphthyl)borate, N,N-dimethyl-(2,4,6-trimethylanilinium) tetrakis(perfluoronaphthyl)borate, and tropillium tetrakis(perfluoronaphthyl)borate.

The typical activator-to-catalyst ratio, e.g., all NCA activators-to-catalyst ratio is about a 1:1 molar ratio. Alternate preferred ranges include from about 0.1:1 to about 100:1, alternately from about 0.5:1 to about 200:1, alternately from about 1:1 to about 500:1, alternately from about 1:1 to about 1000:1. A particularly useful range is from about 0.5:1 to about 10:1, preferably about 1:1 to about 5:1.

It is also within the scope of the present disclosure that the catalyst compounds can be combined with combinations of alumoxanes and NCA's (see for example, U.S. Pat. Nos. 5,153,157, 5,453,410, European Patent No. 0 573 120 B1, International Publication Nos. WO 94/07928, and WO 95/14044 which discuss the use of an alumoxane in combination with an ionizing activator).

Optional Scavengers or Co-Activators

In addition to these activator compounds, one or more scavengers or co-activators may be used in the catalyst system. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc. Those scavengers having bulky or $C_6$ to $C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavengers may be unnecessary. Alumoxanes, such as methylalumoxane or bis(diisobutylaluminum)oxide (DIBALO), also may be added in scavenging quantities with other activators, such as$[Me_2HNPh]^+[B(pfp)_4]^-$ or $B(pfp)_3$ (perfluorophenyl=pfp=$C_6F_5$). In an embodiment, the molar ratio of aluminum scavenger to catalyst is from 5:1 to 30:1.

Suitable aluminum alkyl or organoaluminum compounds which may be utilized as co-activators include, for example, trimethylaluminum, triethylaluminum, tri-iso-butylaluminum, tri-n-hexylaluminum, or tri-n-octylaluminum. In an embodiment, the co-activators are present at less than about 14 wt %, or from about 0.1 to about 10 wt %, or from about 0.5 to about 7 wt %, by weight of the catalyst system. Alternately, the complex-to-co-activator molar ratio is from about 1:100 to about 100:1; about 1:75 to about 75:1; about 1:50 to about 50:1; about 1:25 to about 25:1; about 1:15 to about 15:1; about 1:10 to about 10:1; about 1:5 to about 5:1; about 1:2 to about 2:1; about 1:100 to about 1:1; about 1:75 to about 1:1; about 1:50 to about 1:1; about 1:25 to about 1:1; about 1:15 to about 1:1; about 1:10 to about 1:1; about 1:5 to about 1:1; about 1:2 to about 1:1; about 1:10 to about 2:1.

Polymerization Processes

The present disclosure also relates to the process above where the ethylene, the one or more $C_3$ to $C_{20}$ alpha-olefins, the activator, and the pyridyldiamido transition metal complex are contacted under polymerization conditions prior to addition of the chain transfer agent. In an embodiment, the polymerization is performed in two stages, with the chain transfer agent being introduced in the second stage. The two stages may be two continuous stirred tank reactors connected in series or the two stages may be different zones of a tubular reactor. Alternatively, the two stages may be earlier and later times during a polymerization conducted in a stirred reactor or in a batch process.

The catalysts and catalyst systems described herein are useful in polymerizing unsaturated monomers conventionally known to undergo transition metal catalyzed polymerization such as solution, slurry, gas-phase, and high-pressure polymerization. Typically one or more of the supported catalysts described herein, one or more activators, and one or more monomers are contacted to produce polymer. In certain embodiments, the complexes may be supported and as such will be particularly useful in the known, fixed-bed, moving-bed, fluid-bed, slurry, solution, or bulk operating modes conducted in single, series, or parallel reactors.

One or more reactors in series or in parallel may be used. The complexes, chain transfer agent, activator, and when desired, co-activator, may be delivered as a solution or slurry, either separately to the reactor, activated in-line just prior to the reactor, or preactivated and pumped as an activated solution or slurry to the reactor. Polymerizations are carried out in either single reactor operation, in which monomer, comonomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to a first reactor and another component to other reactors. In one preferred embodiment, the complex is activated in the reactor in the presence of olefin.

In a particularly preferred embodiment, the polymerization process is a continuous process.

In some embodiments, a method of polymerizing olefins to produce at least one polyolefin composition is provided. The method includes contacting at least one olefin with any catalyst system of the present disclosure; and obtaining a polyolefin. If an activator(s) is used, the catalyst compounds and activator(s) may be combined in any order, and are combined typically prior to contacting with the monomer (such as ethylene).

Polymerization may be homogeneous (solution or bulk polymerization) or heterogeneous (slurry -in -liquid diluent, or gas phase -in -gaseous diluent). In the case of heterogeneous slurry or gas phase polymerization, the complex and activator may be supported. Supports useful herein are described above. Chain transfer agents may also be used herein.

Alpha-Olefin Monomers

Monomers and comonomers useful herein include substituted or unsubstituted $C_2$ to $C_{40}$ alpha-olefins, preferably $C_2$ to $C_{20}$ alpha-olefins, preferably $C_2$ to $C_{12}$ alpha olefins, preferably ethylene, propylene, butene, pentene, hexene, heptene, octene, nonene, decene, undecene, dodecene and isomers thereof, and combinations thereof. In a preferred embodiment of the present disclosure, the monomer includes propylene and an optional comonomer comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another preferred embodiment, the monomer includes ethylene and an optional comonomer comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, more preferably norbornene, norbornadiene, and dicyclopentadiene.

In some embodiments one or more dienes are present in the polymer produced herein at up to about 10 wt %, preferably at about 0.00001 to about 1.0 wt %, more preferably about 0.002 to about 0.5 wt %, even more preferably about 0.003 to about 0.2 wt %, based upon the total weight of the composition. In some embodiments about 500 ppm or less of diene is added to the polymerization, preferably about 400 ppm or less, more preferably about 300 ppm or less. In other embodiments at least about 50 ppm of diene is added to the polymerization, or about 100 ppm or more, or about 150 ppm or more. Preferred diolefin monomers useful in the present disclosure include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Most preferred olefins for the methods of polymerizing olefins described herein include ethylene, propylene, butene, pentene, hexene, heptene, octene, nonene, decene, undecene, dodecene, 4-methylpentene-1, 3-methylpentene-1, 5-ethylnonene-1, 5-ethylidene-2-norbornene (ENB), dicyclopentadiene (DCPD), vinyl norbornene (VNB), 3,5,5-trimethylhexene-1, or mixtures thereof.

Polymerization processes of the present disclosure can be carried out in any suitable manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (A homogeneous polymerization process is defined to be a process where at least about 90 wt % of the product is soluble in the reaction media.) A bulk homogeneous process is particularly preferred. (A bulk process is defined to be a process where monomer concentration in all feeds to the reactor is about 70 vol % or more.) Alternately, no solvent or diluent is present or added in the reaction medium, (except for the small amounts used as the carrier for the catalyst system or other additives, or amounts typically found with the monomer; e.g., propane in propylene). According to an embodiment, a method of polymerizing olefins to produce at least one polyolefin composition includes contacting at least one olefin with a catalyst system of the present disclosure; and obtaining a polyolefin. A method of polymerizing olefins can include introducing any catalyst system described herein into a reactor as a slurry.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$-$C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In at least one embodiment, the solvent is not aromatic, preferably aromatics are present in the solvent at less than about 1 wt %, preferably less than about 0.5 wt %, preferably less than about 0 wt % based upon the weight of the solvents.

In some embodiments, the feed concentration of the monomers and comonomers for the polymerization is about 60 vol % solvent or less, preferably about 40 vol % or less, or more preferably about 20 vol % or less, based on the total volume of the feedstream. Preferably the polymerization is run in a bulk process.

Preferred polymerizations can be run at any temperature and/or pressure suitable to obtain the desired ethylene polymers. Typical temperatures and/or pressures include a temperature in the range of from about 0° C. to about 300° C., preferably about 30° C. to about 200° C., more preferably about 60° C. to about 195° C., even more preferably from about 75° C. to about 190° C., or especially preferably from about 80° C. to about 100° C.; and at a pressure in the range of from about 0.35 MPa to about 1500 MPa, preferably from about 0.45 MPa to about 100 MPa, more preferably from about 0.5 MPa to about 50 MPa, or even more preferably from about 1.7 MPa to about 30 MPa. In a typical polymerization, the run time of the reaction is up to about 300 minutes, preferably in the range of from about 0 to about 250 minutes, more preferably from about 0 to about 120 minutes, even more preferably in the range of from about 0 to about 30 minutes, or especially preferably about 0 to about 10 minutes.

In some embodiments, hydrogen is present in the polymerization reactor at a partial pressure of about 0.001 to about 50 psig (about 0.007 to about 345 kPa), preferably from about 0.01 to about 25 psig (about 0.07 to about 172 kPa), more preferably about 0.1 to about 10 psig (about 0.7 to about 70 kPa).

In a preferred embodiment, little or no alumoxane is used in the process to produce the polymers. Preferably, alumoxane is present at about zero mol %, alternately the alumoxane is present at a molar ratio of aluminum to transition metal less than about 500:1, preferably less than about 300:1, more preferably less than about 100:1, even more preferably less than about 30:1.

In a preferred embodiment, little or no scavenger is used in the process to produce the ethylene polymer. Preferably, scavenger (such as tri alkyl aluminum) is present at about zero mol %, alternately the scavenger is present at a molar ratio of scavenger metal to transition metal of less than about 100:1, preferably less than about 50:1, more preferably less than about 15:1, even more preferably less than about 10:1.

In a preferred embodiment, the polymerization: 1) is conducted at temperatures of about 0 to about 300° C. (preferably about 25 to about 150° C., more preferably about 80 to about 150° C., even more preferably about 100 to about 140° C.); 2) is conducted at a pressure of atmospheric pressure to about 50 MPa; 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than about 1 wt %, more preferably less than about 0.5 wt %, even more preferably at about 0 wt % based upon the weight of the solvents); 4) wherein the catalyst system used in the polymerization includes less than about 0.5 mol %, preferably about 0 mol % alumoxane, alternately the alumoxane is present at a molar ratio of aluminum to transition metal less than about 500:1, preferably less than about 300:1, more preferably less than about 100:1, even more preferably less than about 1:1; 5) the polymerization preferably occurs in one reaction zone. Preferably, the polymerization uses a single reactor. Room temperature is about 23° C. unless otherwise noted.

Other additives may also be used in the polymerization, as desired, such as one or more scavengers, promoters, modifiers, hydrogen, chain transfer agents (including zinc and aluminum-based chain transfer agents such as diethyl zinc), hydrogen, aluminum alkyls, or silanes.

Useful chain transfer agents are typically trialkylaluminums and dialkylzincs, which are represented by the formulas $AlR_3$ and $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, trimethylaluminum, triisobutylaluminum, trioctylaluminum, or a combination thereof.

In at least one embodiment the pyridyldiamido transition metal complex is (Complex 1)

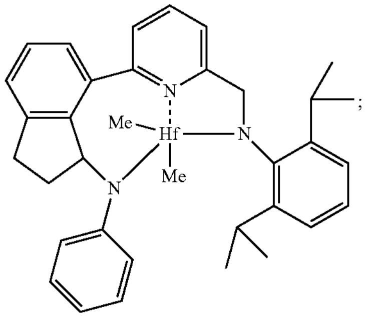

;

and the activator is N,N-dimethylanilinium tetrakis(perfluorophenyl)borate. The synthesis of this pyridyldiamido transition metal complex is disclosed in PCT/US19/21164.

Solution Polymerization

A solution polymerization is a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng, Chem. Res. 29, 2000, 4627. Generally solution polymerization involves polymerization in a continuous reactor in which the polymer formed and the starting monomer and catalyst materials supplied, are agitated to reduce or avoid concentration gradients and in which the monomer acts as a diluent or solvent or in which a hydrocarbon is used as a diluent or solvent. Suitable processes typically operate at temperatures from about 0° C. to about 250° C., preferably from about 10° C. to about 150° C. and at pressures of about 0.1 MPa or more, preferably about 2 MPa or more. The upper pressure limit is typically about 200 MPa or less, preferably, about 120 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can also be introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

Scavengers

In some embodiments, when using the complexes described herein, particularly when they are immobilized on a support, the catalyst system will additionally comprise one or more scavenging compounds ("scavengers"). Here, the term scavenger means a compound that removes polar impurities from the reaction environment. These impurities adversely affect catalyst activity and stability. Typically, the scavenger will be an organometallic compound such as the Group 13 organometallic compounds of U.S. Pat. Nos. 5,153,157; 5,241,025; International Publication Nos. WO-A-91/09882; WO-A-94/03506; WO-A-93/14132; and that of WO 95/07941. Exemplary compounds include triethyl aluminum, triethyl borane, tri-iso-butyl aluminum, methyl alumoxane, modified methylalumoxanes, bis(diisobutylaluminum)oxide, iso-butyl alumoxane, and tri-n-octyl aluminum. Those scavengers having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavengers may be unnecessary. Alumoxanes (methylalumoxane), aluminum oxides (e.g., bis(diisobutylaluminum)oxide), and modified alumoxanes (e.g., MMAO- 3A) also may be added in scavenging quantities with other activators such as $[Me2HNPh]^+[B(pfp)_4]^-$ or $B(pfp)_3$ (perfluorophenyl=pfp=$C_6F_5$).

Polyolefin Products

This disclosure also relates to compositions of matter produced by the methods described herein. In a preferred embodiment, the catalyst systems and methods herein produce polyolefins.

In some embodiments, the copolymer has an ethylene content of less than about 70 wt %, preferably less than about 60 wt %, most preferably from about 45 wt % to about 55 wt %. Alternatively, the copolymer can comprises an ethylene content of about 51 wt % to about 55 wt %. In some embodiments, the copolymer has an Mw(DRI) of from about 50,000 g/mol to about 500,000 g/mol, more preferably about 50,000 to about 300,000 g/mol, most preferably from about 50,000 g/mol to about 250,000 g/mol; and a PDI (Mw(DRI)/Mn(DRI)) 1.1-1.9, preferably less than 1.7, and more preferably 1.6 or lower and most preferably less than 1.4.

In some embodiments, the copolymer has a g'vis of about 0.90 or more, preferably about 0.95 or more, more preferably about 0.96 or more.

In some embodiments, the ethylene copolymers described herein typically have crystallization temperatures ($T_c$) in the range from about −60° C. to about 0° C.

Further, in some embodiments, the copolymers described herein have a thickening efficiency of more than about 0.5, preferably more than about 1.0, more preferably more than about 1.5, even more preferably more than about 2.

Unless otherwise indicated, measurements of the moments of molecular weight, i.e., weight average molecular weight (Mw), number average molecular weight (Mn), and z average molecular weight (Mz) are determined by Gel Permeation Chromatography (GPC) as described in Macromolecules, 2001, Vol. 34, No. 19, pg. 6812, which is fully incorporated herein by reference, including that, a High Temperature Size Exclusion Chromatograph (SEC, Waters Alliance 2000), equipped with a differential refractive index detector (DRI) equipped with three Polymer Laboratories PLgel 10 mm Mixed-B columns is used. The instrument is operated with a flow rate of about 1.0 $cm^3$/min, and an injection volume of about 300 μL. The various transfer lines, columns, and differential refractometer (the DRI detector) are housed in an oven maintained at about 145° C. Polymer solutions are prepared by heating about 0.75 to about 1.5 mg/ml of polymer in filtered 1,2,4-trichlorobenzene (TCB) containing ~1000 ppm of butylated hydroxy toluene (BHT) at about 160° C. for about 2 hours with continuous agitation. A sample of the polymer containing solution is injected into to the GPC and eluted using filtered 1,2,4-trichlorobenzene (TCB) containing ~1000 ppm of BHT. The separation efficiency of the column set is calibrated using a series of narrow MWD polystyrene standards reflecting the expected Mw range of the sample being analyzed and the exclusion limits of the column set. Seventeen individual polystyrene standards, obtained from Polymer Laboratories (Amherst, Mass.) and ranging from Peak Molecular Weight (Mp) ~580 to 10,000,000, were used to generate the calibration curve. The flow rate is calibrated for each run to give a common peak position for a flow rate marker (taken to be the positive inject peak) before determining the retention volume for each polystyrene standard. The flow marker peak position is used to correct the flow rate when analyzing samples. A calibration curve (log(Mp) vs. retention volume) is generated by recording the retention volume at the peak in the DRI signal for each PS standard, and fitting this data set to a 2nd-order polynomial. The equivalent polyethylene molecular weights are determined by using the Mark-Houwink coefficients shown in Table B.

TABLE B

| Mark-Houwink coefficients | | |
|---|---|---|
| Material | K (dL/g) | α |
| PS | $1.75 \times 10^{-4}$ | 0.67 |
| PE | $5.79 \times 10^{-4}$ | 0.695 |

In at least some embodiments, the polymer produced is a tactic polymer, preferably an isotactic or highly isotactic polymer. In at least some embodiments, the polymer produced is isotactic polypropylene, such as highly isotactic polypropylene.

The term "isotactic polypropylene" (iPP) is defined as having at least about 10% or more isotactic pentads. The term "highly isotactic polypropylene" is defined as having about 50% or more isotactic pentads. The term "syndiotactic polypropylene" is defined as having about 10% or more syndiotactic pentads. The term "random copolymer polypropylene" (RCP), also called propylene random copolymer, is defined to be a copolymer of propylene and about 1 to about 10 wt % of an olefin chosen from ethylene and $C_4$ to $C_8$ alpha-olefins. Preferably, isotactic polymers (such as iPP) have at least about 20% (preferably at least about 30%, preferably at least about 40%) isotactic pentads. A polyolefin is "atactic," also referred to as "amorphous" if it has less than about 10% isotactic pentads and syndiotactic pentads.

Polypropylene microstructure is determined by $^{13}C$ NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}C$-NMR Method (Academic Press, New York, 1977).

The ethylene copolymers according to the present invention are used in lubricating compositions, typically as viscosity modifiers.

Lubrication Oil Compositions and Fuel Oil Compositions

Lubricating oil compositions containing the copolymer herein and one or more base oils (or base stocks) are also provided. The base stock can be or include natural or synthetic oils of lubricating viscosity, whether derived from hydrocracking, hydrogenation, other refining processes, unrefined processes, or re-refined processes. The base stock can be or include used oil. Natural oils include animal oils, vegetable oils, mineral oils and mixtures thereof. Synthetic oils include hydrocarbon oils, silicon-based oils, and liquid esters of phosphorus-containing acids. Synthetic oils may be produced by Fischer-Tropsch gas-to-liquid synthetic procedure as well as other gas-to-liquid oils.

In one embodiment, the base stock is or includes a polyalphaolefin (PAO) including a PAO-2, PAO-4, PAO-5, PAO-6, PAO-7 or PAO-8 (the numerical value relating to Kinematic Viscosity at 100° C., ASTM D445). Preferably, the polyalphaolefin can be prepared from dodecene and/or decene. Generally, the polyalphaolefin suitable as an oil of lubricating viscosity has a viscosity less than that of a PAO-20 or PAO-30 oil. In one or more embodiments, the base stock can be defined as specified in the American Petroleum Institute (API) Base Oil Interchangeability Guidelines. For example, the base stock can be or include an API Group I, II, III, IV, and V oil or mixtures thereof.

PAOs useful herein are commercially available as SpectraSyn™ and SpectraSyn Ultra™ from ExxonMobil Chemical in Houston, Texas (previously sold under the SHF and SuperSyn™ tradenames by ExxonMobil Chemical Company), some of which are summarized in Table A below. Other useful PAOs include those sold under the tradenames Synfluid™ available from Chevron Phillips Chemical Company (Pasadena, Texas), Durasyn™ available from Innovene (Chicago, Illinois), Nexbase™ available from Neste Oil (Keilaniemi, Finland), and Synton™ available from Chemtura Corporation (Middlebury, Connecticut).

| | KV100 (cSt) | KV40 (cSt) | VI | Pour Point[1] (° C.) | Specific Gravity[2] | Flash Point[3] (° C.) | APHA Color[4] |
|---|---|---|---|---|---|---|---|
| SpectraSyn 4 | 4 | 19 | 126 | −66 | 0.820 | 220 | 10 |
| SpectraSyn Plus 4 | 4 | 17 | 122 | −60 | 0.820 | 228 | 10 |
| SpectraSyn 6 | 6 | 31 | 138 | −57 | 0.827 | 246 | 10 |
| SpectraSyn Plus 6 | 6 | 30 | 140 | −54 | 0.827 | 246 | 10 |
| SpectraSyn 8 | 8 | 48 | 139 | −48 | 0.833 | 260 | 10 |
| SpectraSyn 10 | 10 | 66 | 137 | −48 | 0.835 | 266 | 10 |
| SpectraSyn 40 | 39 | 396 | 147 | −36 | 0.850 | 281 | 10 |
| SpectraSyn 100 | 100 | 1240 | 170 | −30 | 0.853 | 283 | 60 |
| SpectraSyn Ultra | 150 | 1500 | 218 | −33 | 0.850 | >265 | 10 |
| SpectraSyn Ultra 300 | 300 | 3100 | 241 | −27 | 0.852 | >265 | 20 |
| SpectraSyn Ultra 1000 | 1000 | 10000 | 307 | −18 | 0.855 | >265 | 30 |

[1]ASTM D97;
[2]ASTM D4052 (15.6, 15.6° C.);
[3]ASTM D92;
[4]ASTM D1209

In one or more embodiments, the base stock can include oil or blends thereof conventionally employed as crankcase lubricating oils. For example, suitable base stocks can include crankcase lubricating oils for spark-ignited and compression-ignited internal combustion engines, such as automobile and truck engines, marine and railroad diesel engines, and the like. Suitable base stocks can also include those oils conventionally employed in and/or adapted for use as power transmitting fluids such as automatic transmission fluids, tractor fluids, universal tractor fluids and hydraulic fluids, heavy duty hydraulic fluids, power steering fluids and the like. Suitable base stocks can also be or include gear lubricants, industrial oils, pump oils and other lubricating oils.

In one or more embodiments, the base stock can include not only hydrocarbon oils derived from petroleum, but also include synthetic lubricating oils such as esters of dibasic acids; complex esters made by esterification of monobasic acids, polyglycols, dibasic acids and alcohols; polyolefin oils, etc. Thus, the lubricating oil compositions described can be suitably incorporated into synthetic base oil base stocks such as alkyl esters of dicarboxylic acids, polyglycols and alcohols; polyalphaolefins; polybutenes; alkyl benzenes; organic esters of phosphoric acids; polysilicone oils.

Thickening efficiency (TE) is a measure of the thickening ability of the polymer in oil, and is defined as: $TE=2/c\times\ln((kv_{(polymer+oil)})/kv_{oil})/\ln(2)$, where c is the concentration of the polymer and kv is kinematic viscosity at 100° C. according to ASTM D445. The shear stability index (SSI) is an indication of the resistance of polymers to permanent mechanical shear degradation in an engine. The SSI can be determined by passing a polymer-oil solution for 30 cycles through a high shear Bosch diesel injector according to the procedures listed in ASTM D6278.

The lubrication oil composition preferably comprises about 0.1 to about 2.5 wt %, or about 0.25 to about 1.5 wt %, or about 0.5 wt % or about 1.0 wt % of the polymer produced herein. In some embodiments, the amount of the polymer produced herein in the lubrication oil composition can range from a low of about 0.5 wt %, about 1 wt %, or about 2 wt % to a high of about 2.5 wt %, of about 3 wt %, of about 5 wt %, of about 10 wt %, or of about 12 wt %.

Oil Additives

The lubricating oil compositions can optionally contain one or more conventional additives, such as, for example, pour point depressants, antiwear agents, antioxidants, other viscosity-index improvers, dispersants, corrosion inhibitors, anti-foaming agents, detergents, rust inhibitors, friction modifiers, and the like.

Corrosion inhibitors, also known as anti-corrosive agents, promote the mechanical integrity of the metallic parts contacted by the lubricating oil composition. Illustrative corrosion inhibitors include phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from about 5 wt % to about 30 wt % of a sulfide of phosphorus for about ½ to about 15 hours, at a temperature in the range of about 66° C. to about 316° C. Neutralization of the phosphosulfurized hydrocarbon may be effected in the manner known by those skilled in the art.

Oxidation inhibitors, or antioxidants, reduce the tendency of mineral oils to deteriorate in service, as evidenced by the products of oxidation such as sludge and varnish-like deposits on the metal surfaces, and by viscosity growth. Such oxidation inhibitors include alkaline earth metal salts of alkylphenolthioesters having $C_5$ to $C_{12}$ alkyl side chains, e.g., calcium nonylphenate sulfide, barium octylphenate sulfide, dioctylphenylamine, phenylalphanaphthylamine, phosphosulfurized or sulfurized hydrocarbons, etc. Other useful oxidation inhibitors or antioxidants include oil-soluble copper compounds, such as described in U.S. Pat. No. 5,068,047.

Friction modifiers serve to impart the proper friction characteristics to lubricating oil compositions such as automatic transmission fluids. Representative examples of suitable friction modifiers are found in U.S. Pat. No. 3,933,659, which discloses fatty acid esters and amides; U.S. Pat. No. 4,176,074, which describes molybdenum complexes of polyisobutenyl succinic anhydride-amino alkanols; U.S. Pat. No. 4,105,571, which discloses glycerol esters of dimerized fatty acids; U.S. Pat. No. 3,779,928, which discloses alkane phosphonic acid salts; U.S. Pat. No. 3,778,375, which discloses reaction products of a phosphonate with an oleamide; U.S. Pat. No. 3,852,205, which discloses S-carboxyalkylene hydrocarbyl succinimide, S-carboxyalkylene hydrocarbyl succinamic acid and mixtures thereof; U.S. Pat. No. 3,879,306, which discloses N-(hydroxyalkyl)alkenyl-succinamic acids or succinimides; U.S. Pat. No. 3,932,290, which discloses reaction products of di-(lower alkyl) phosphites and epoxides; and U.S. Pat. No. 4,028,258, which discloses the alkylene oxide adduct of phosphosulfurized N-(hydroxyalkyl) alkenyl succinimides. Preferred friction modifiers are succinate esters, or metal salts thereof, of hydrocarbyl substituted succinic acids or anhydrides and thiobis-alkanols, such as described in U.S. Pat. No. 4,344,853.

Dispersants maintain oil insolubles, resulting from oxidation during use, in suspension in the fluid, thus preventing sludge flocculation and precipitation or deposition on metal parts. Suitable dispersants include high molecular weight N-substituted alkenyl succinimides, the reaction product of oil-soluble polyisobutylene succinic anhydride with ethylene amines such as tetraethylene pentamine and borated salts thereof. High molecular weight esters (resulting from the esterification of olefin substituted succinic acids with mono or polyhydric aliphatic alcohols) or Mannich bases from high molecular weight alkylated phenols (resulting from the condensation of a high molecular weight alkylsubstituted phenol, an alkylene polyamine and an aldehyde such as formaldehyde) are also useful as dispersants.

Pour point depressants ("ppd"), otherwise known as lube oil flow improvers, lower the temperature at which the fluid will flow or can be poured. Any suitable pour point depressant known in the art can be used. For example, suitable pour point depressants include, but are not limited to, one or more $C_8$ to $C_{18}$ dialkylfumarate vinyl acetate copolymers, polymethyl methacrylates, alkylmethacrylates and wax naphthalene. A lubrication oil composition can include a base stock and one or more copolymers produced herein, and optionally, a pour point depressant.

Foam control can be provided by any one or more anti-foamants. Suitable anti-foamants include polysiloxanes, such as silicone oils and polydimethyl siloxane.

Anti-wear agents reduce wear of metal parts. Representatives of conventional antiwear agents are zinc dialkyldithiophosphate and zinc diaryldithiosphate, which can also serve as an antioxidant.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal salts, such as highly basic alkaline earth metal sulfonates (especially Ca and Mg salts) are frequently used as detergents.

When lubricating oil compositions contain one or more of the components discussed above, the additive(s) are blended into the composition in an amount sufficient for it to perform its intended function. Typical amounts of such additives useful in the present invention are shown in Table A below.

TABLE A

Typical Amounts of Various Lubricating Oil Components

| Compound | wt % (typical) | wt % (preferred) |
|---|---|---|
| Detergents/Rust Inhibitors | about 0.01 to about 8 | about 0.01 to about 4 |
| Dispersants | about 0.1 to about 20 | about 0.1 to about 8 |
| Antiwear agents | about 0.01 to about 6 | about 0.01 to about 4 |
| Friction Modifiers | about 0.01 to about 15 | about 0.01 to about 5 |
| Antioxidants | about 0.01 to about 5 | about 0.1 to about 2 |
| Pour Point Depressants | about 0.01 to about 5 | about 0.1 to about 1.5 |
| Anti-foam Agents | about 0 to about 1 | about 0.001 to about 0.2 |
| Corrosion Inhibitors | about 0 to about 5 | about 0 to about 1.5 |
| Other Viscosity Improvers (solid polymer basis) | about 0.25 to about 10 | about 0.25 to about 5 |

When other additives are used, it may be desirable, although not necessary, to prepare additive concentrates that include concentrated solutions or dispersions of the VI improver (in concentrated amounts), together with one or more of the other additives, such a concentrate denoted an "additive package," whereby several additives can be added simultaneously to the base stock to form a lubrication oil composition. Dissolution of the additive concentrate into the lubrication oil can be facilitated by solvents and by mixing accompanied with mild heating, but this is not essential. The additive-package can be formulated to contain the VI improver and optional additional additives in proper amounts to provide the desired concentration in the final formulation when the additive-package is combined with a predetermined amount of base oil.

Blending with Base Stock Oils

Conventional blending methods are described in U.S. Pat. No. 4,464,493, which is incorporated by reference herein. This conventional process typically involves passing the polymer through an extruder at elevated temperature for degradation of the polymer and circulating hot oil across the die face of the extruder while reducing the degraded polymer to particle size upon issuance from the extruder and into the hot oil. The pelletized, solid polymer of the present disclosure can be added by blending directly with the base oil so that the complex multi-step conventional process is not needed. The solid polymer composition can be dissolved in the base stock without a need for additional shearing and degradation processes.

The polymer compositions will be soluble at room temperature in lube oils at up to about 10% concentration in order to prepare a viscosity modifier concentrate. Such concentrates, including eventually an additional additive package including the typical additives used in lube oil applications as described above, are generally further diluted to the final concentration (usually around 1%) by multigrade lube oil producers. In this case, the concentrate will be a pourable homogeneous solid-free solution.

The copolymers produced herein preferably have a shear stability index of SSI (determined according to ASTM D6278, 30 cycles) of from about 1 to about 55, preferably about 1 to about 35, and more preferably about 1 to about 25.

The copolymers produced herein preferably have a shear stability index of SSI (determined according to ASTM D7109, 90 cycles) of from about 1 to about 50, more preferably about 1 to about 40, and even more preferably about 1 to about 30.

The following further embodiments are contemplated as within the scope of the present invention.

Embodiment A

Embodiment A

An ethylene and $C_3$ to $C_{20}$ alpha-olefin copolymer having a Mw(DRI)/Mn(DRI) of from 1.1 to 1.9;

a Mw(DRI) of from about 50,000 g/mol to about 250,000 g/mol; and an ethylene content of from about 45 wt % to about 70 wt %.

Embodiment B

The ethylene copolymer of Embodiment A, wherein the ethylene content is from about 45 wt % to about 60 wt %.

Embodiment C

The ethylene copolymer of Embodiment A, wherein the ethylene content is from about 45 wt % to about 55 wt %.

Embodiment D

The ethylene copolymer of any one of Embodiments A to C, wherein the ethylene content is at least 51 wt % .

Embodiment E

The ethylene copolymer of any one of Embodiments A to D, wherein said $C_3$ to $C_{20}$ alpha-olefin is propylene.

Embodiment F

The ethylene copolymer of any one of Embodiments A to E, wherein the copolymer has: a thickening efficiency of about 1 to 5 and SSI of about 1 to 55.

Embodiment G

The ethylene copolymer of any one of Embodiments A to F, wherein the Mw(DRI)/Mn(DRI) is less than 1.7.

Embodiment H

The ethylene copolymer of any one of Embodiments A to F, wherein the Mw(DRI)/Mn(DRI) is 1.6 or less.

Embodiment I

The ethylene copolymer of any one of Embodiments A to F, wherein the Mw(DRI)/Mn(DRI) is less than 1.4.

Embodiment J

The ethylene copolymer of any Embodiments A to F, wherein the Mw(DRI)/Mn(DRI) is not 1.40 or 1.48.

Embodiment K

A lubricating composition comprising an oil and the copolymer of any one of Embodiments A to J.

Embodiment L

The lubricating composition of Embodiment K, wherein the ethylene copolymer increases the Kinematic viscosity at 100° C. of the lubricating oil by at least about 50%.

Embodiment M

The lubricating composition of any one of Embodiments K or L, wherein the oil comprises a polyalphaolefin.

Embodiment N

The lubricating composition of any one of Embodiments K to M, which comprises about 0.1 wt. % to about 12 wt. % of said copolymer.

Embodiment O

The lubricating composition of any one of Embodiments K to N, which comprises at least one member selected from the group of pour point depressants, antiwear agents, antioxidants, other viscosity-index improvers, dispersants, corrosion inhibitors, anti-foaming agents, detergents, rust inhibitors, and friction modifiers.

Embodiment P

The lubricating composition of any one of Embodiments K to O , which comprises from about 0.1% to about 12% of the ethylene copolymer; at least one additive selected from the group of from about 0% to about 5% of a corrosion inhibitor; from about 0.01% to about 5% of an antioxidant; from about 0.01% to about 5% of a pour point depressant; from about 0% to about 1% of an anti-foaming agent; from about 0.01% to about 6% of an anti-wear agent; from about 0.01% to about 15% of a friction modifier; from about 0.01% to about 8% of a detergent; from about 0.1% to about 20% of a dispersant and from about 0.25% to about 10% of another viscosity improving agent; and a base oil.

Embodiment Q

The lubricating composition of any one of Embodiments K to O, which comprises from about 0.5% to about 12% of the ethylene copolymer; at least one additive selected from the group of from about 0% to about 1.5% of a corrosion inhibitor; from about 0.1% to about 2% of an antioxidant; from about 0.1% to about 1.5% of a pour point depressant; from about 0.001% to about 0.2% of an anti-foaming agent; from about 0.01% to about 4% of an anti-wear agent; from about 0.01% to about 5% of a friction modifier; from about 0.01% to about 4% of a detergent; from about 0.1% to about 8% of a dispersant and from about 0.25% to about 5% of another viscosity improving agent; and a base oil.

Polymerization

The following describes the general polymerization procedure used for the present disclosure. The desired temperatures, pressures, quantities of chemicals used (e.g., precatalysts, activators, scavengers, etc.) will vary from experiment to experiment, and specific values are given in Table 1 (or immediately above or below the Table) where data are presented.

Each polymerization was performed in a stirred autoclave reactor (1 liter or 2 liter volume). Details of the polymerization conditions and the polymers formed are reported in Tables 1 and 2. All solvents, reactants, and gases were purified by passing through multiple columns containing 3 Å molecular sieves and oxygen scavenger. Propylene, isohexane, scavenger (bis(diisobutylaluminum)oxide), diethylzinc and activator N,N-dimethylanilinium tetrakis(pentafluorophenyl)borate (1.1 molar equivalent per Hf) were added to the reactor and the mixture was heated to the desired temperature. The reactor pressure was then noted and ethylene was added to the desired pressure above the reactor pressure. After stirring the mixture for several minutes, a solution of complex 1 in toluene (about 5 ml) was pushed in with a chaser of isohexane (100 mL). Polymerization was carried out for about 5 minutes before isopropanol (about 20 ml) was injected to quench the reaction. The reactor was then cooled, depressurized, and opened. The residual volatiles in the product were removed under a stream of nitrogen, followed by heating the sample in a vacuum oven at about 60° C.

Polymer Characterization

Polymer sample solutions were prepared by dissolving polymer in 1,2,4-trichlorobenzene (TCB, 99+% purity from Sigma-Aldrich) containing 2,6-di-tertbutyl-4-methylphenol (BHT, 99% from Aldrich) at 165° C. in a shaker oven for approximately 3 hours. The typical concentration of polymer in solution was between 0.1 to 0.9 mg/ml with a BHT concentration of 1.25 mg BHT/ml of TCB.

Molecular Weight, Comonomer Composition and Long Chain Branching Determination by GPC-IR Hyphenated with Multiple Detectors Unless otherwise indicated, the distribution and the moments of molecular weight (Mw, Mn, Mw/Mn, etc.), the comonomer content (C2, C3, C6, etc.) and the branching index (g'vis) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation:

$$C=\beta I$$

where $\beta$ is the mass constant.

The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation $$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha_{PS}$=0.67 and $K_{PS}$=0.000175 while $\alpha$ and K are for other materials as calculated and published in literature (Sun, T. et al. *Macromolecules* 2001, 34, 6812), except that for purposes of the present disclosure, $\alpha$=0.695 and K=0.000579 for linear ethylene polymers, $\alpha$=0.705 and K=0.0002288 for linear propylene polymers, $\alpha$=0.695 and K=0.000181 for linear butene polymers, a is 0.695 and K is 0.000579*(1−0.0087*w2b+0.000018*(w2b)^2) for ethylene-butene copolymer where w2b is a bulk weight percent of butene comonomer, a is 0.695 and K is 0.000579*(1−0.0075*w2b) for ethylene-hexene copolymer where w2b is a bulk weight percent of hexene comonomer, and a is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for C3, C4, C6, C8, and so on comonomers, respectively.

$$w2=f * SCB/1000TC.$$

The bulk composition of the polymer from the GPC-IR and GPC-1D analyses is obtained by considering the entire signals of the $CH_3$ and $CH_2$ channels between the integration limits of the concentration chromatogram. First, the following ratio is obtained $$\text{Bulk } IR \text{ ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/100(TC) is obtained by weight-averaging the chain-end correction over the molecular-weight range. Then $$w2b = f * \text{bulk CH3}/1000TC$$

$$\text{bulk } SCB/1000TC = \text{bulk CH3}/1000TC - \text{bulk } \frac{\text{CH3end}}{1000TC}$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, P(O) is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and A2=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [$\eta$], at each point in the chromatogram is calculated from the equation $[\eta]=\eta_s/c$, where c is concentration and is determined from the IR5 broadband channel output. The viscosity MW at each point is calculated as $$M=K_{PS}M^{\alpha_{ps}+1}/[\eta],$$

where $\alpha_{ps}$ is 0.67 and $K_{PS}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i[\eta]_i}{\sum c_i},$$

where the summations are over the chromatographic slices, i, between the integration limits.

The branching index $g'_{vis}$ is defined as $$g'_{vis} = \frac{[\eta]_{avg}}{KM_v^{\alpha}},$$

where $M_V$ is the viscosity-average molecular weight based on molecular weights determined by DRI analysis and the K and $\alpha$ are for the reference linear polymer, which are, for purposes of the present disclosure, $\alpha$=0.695 and K=0.000579 for linear ethylene polymers, $\alpha$=0.705 and K=0.0002288 for linear propylene polymers, $\alpha$=0.695 and K=0.000181 for linear butene polymers, a is 0.695 and K is 0.000579*(1−0.0087*w2b+0.000018*(w2b)^2) for ethylene-butene copolymer where w2b is a bulk weight percent of butene comonomer, $\alpha$ is 0.695 and K is 0.000579*(1−0.0075*w2b) for ethylene-hexene copolymer where w2b is a bulk weight percent of hexene comonomer, and $\alpha$ is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, Vol. 34(19), pp. 6812-6820).

All molecular weights are weight average unless otherwise noted. All molecular weights are reported in g/mol unless otherwise noted.

Methyl groups per 1000 carbons ($CH_3$/1000Carbons) is determined by $^1$H NMR.

Melt Index (MI, also referred to as 12) is measured according to ASTM D1238 at 190° C., under a load of 2.16 kg unless otherwise noted. The units for MI are g/10 min or dg/min.

High Load Melt Index (HLMI, also referred to as 121) is the melt flow rate measured according to ASTM D1238 at 190° C., under a load of 21.6 kg. The units for HLMI are g/10 min or dg/min.

Melt Index Ratio (MIR) is the ratio of the high load melt index to the melt index, or I21/I2.

Average wt. % of ethylene (C2 content) is determined by $^1$H NMR and $^{13}$C NMR.

To determine various molecular weight related values by GPC, high temperature size exclusion chromatography was performed using GPC-IR (Polymer Char). The IV (intrinsic viscosity) molecular weights presented in the examples are relative to linear polystyrene standards whereas the LS (light scattering) and TR (infrared) molecular weights are absolute.

Differential Scanning Calorimetry

Crystallization temperature ($T_c$) and melting temperature (or melting point, $T_m$) are measured using Differential Scanning Calorimetry (DSC) on a commercially available instrument (e.g., TA Instruments 2920 DSC). Typically, 6 to 10 mg of molded polymer or plasticized polymer is sealed in an aluminum pan and loaded into the instrument at room temperature. Melting data (first heat) is acquired by heating the sample to at least 30° C. above its melting temperature, typically 220° C. for polyethylene, at a heating rate of 10° C./min. The sample is held for at least 5 minutes at this temperature to destroy its thermal history. Crystallization data are acquired by cooling the sample from the melt to at least 50° C. below the crystallization temperature, typically −100° C. for polyethylene, at a cooling rate of 10° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures reported are the peak melting temperatures from the second heat unless otherwise specified.

For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature). Areas under the DSC curve are used to determine the heat of transition (heat of fusion, Hr, upon melting or heat of crystallization, He, upon crystallization), which can be used to calculate the degree of crystallinity (also called the percent crystallinity). The percent crystallinity (X %) is calculated using the formula:

$$(X\ \%)=[\text{area under the curve (in J/g)}/H°\text{(in J/g)}]*100,$$

where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

The example polymers were tested as viscosity modifiers in lubricants. The polymer samples were blended in a Group I diluent oil to a concentration that yielded a viscosity of approximately 15 cSt. The formulated oils were then tested in a diesel injector equipped shear stability tester according to ASTM D6278.

AC-150™ base oil is a commercial Group I base oil available from ExxonMobil Chemical Co.

SSI-90 is Shear Stability Index as determined according to sheared viscosity via diesel injector at 90 cycles, as determined by ASTM D6278 and ASTM D7109 at 90 cycles.

SSI-30 is Shear Stability Index as determined according to sheared viscosity via diesel injector at 30 cycles according to ASTM D6278.

Thickening Efficiency is determined according to ASTM D445.

VI is viscosity index and is determined according to ASTM D2270.

KV is Kinematic Viscosity as determined by ASTM D445 (KV40) is determined at 40° C., and KV100 is determined at 100° C.).

The polymers were produced under the conditions of Table 1 in a batch reactor. The solvent is isohexane, and the catalyst is complex 1.

Table 2 shows characterization of the ethylene copolymers for Examples A-M, and comparative polymers: Examples N-S. Examples N-S are commercial linear olefin copolymers (OCPs).

Thickening efficiency (TE) is relative a measure of the polymer to increase viscosity of an oil and is defined as: TE=2/c×ln((kv of polymer+oil)/(kv of oil)Y/ln(2) where c is the concentration of the polymer. By definition, a theoretical reference copolymer that will double the reference oil viscosity at 100° C. at a concentration of 1.0 wt % in the oil has a TE=2.0.

TABLE 1

| Example | Complex 1 (nmol) | Reactor Size (1) | Isohexane (ml) | DIBALO (nmolAl) | Propylene (ml) | Ethylene (ml) | $ZnEt_2$ (nmol) | Polym. Temp (° C.) | Yield (g) |
|---|---|---|---|---|---|---|---|---|---|
| A | 1500 | 2.0 | 1200 | 0.28 | 100 | 75 | 0.2 | 90 | 58.80 |
| B | 1500 | 2.0 | 1200 | 0.28 | 100 | 80 | 0.50 | 90 | 72.80 |
| C | 1500 | 2.0 | 1200 | 0.28 | 100 | 70 | 1.00 | 90 | 75.55 |
| D | 1500 | 2.0 | 1200 | 0.28 | 100 | 70 | 0.50 | 90 | 76.60 |
| E | 1500 | 2.0 | 1200 | 0.28 | 125 | 80 | 1.00 | 90 | 103.84 |
| F | 1500 | 2.0 | 1200 | 0.60 | 100 | 100 | 0.12 | 90 | 70.40 |
| G | 1500 | 2.0 | 1200 | 0.28 | 125 | 50 | 1.00 | 90 | 88.2 |
| H | 1500 | 2.0 | 1200 | 0.28 | 125 | 65 | 0.50 | 90 | 44.2 |
| I | 1500 | 2.0 | 1200 | 0.60 | 100 | 100 | 0.24 | 90 | 76.65 |
| J | 1500 | 2.0 | 1200 | 0.60 | 100 | 100 | 0.48 | 90 | 80.30 |
| K | 1500 | 2.0 | 1200 | 0.28 | 100 | 100 | 0.12 | 90 | 59.45 |
| L | 1500 | 2.0 | 1200 | 0.28 | 100 | 125 | 0.20 | 90 | 66.50 |
| M | 1500 | 2.0 | 1200 | 0.30 | 100 | 80 | 1.00 | 90 | 84.70 |

TABLE 2

| Example | Ethylene (wt. %) | Mw (DRI) | Mn (DRI) | Mw/Mn | Tc (° C.) | TE | SSI 30 cycles |
|---|---|---|---|---|---|---|---|
| Inventive examples | | | | | | | |
| A | 54.3 | 158,072 | 93,911 | 1.68 | −30.7 | 2.86 | 41.5 |
| B | 55.8 | 78,965 | 55,632 | 1.42 | −32.7 | 1.81 | 10.7 |
| C | 59.7 | 44,262 | 35,610 | 1.9 | −18.9 | 1.26 | 1.4 |
| D | 55.1 | 72,685 | 52,217 | 1.39 | −34.0 | 1.76 | 8.9 |

TABLE 2-continued

| Example | Ethylene (wt. %) | Mw (DRI) | Mn (DRI) | Mw/Mn | Tc (° C.) | TE | SSI 30 cycles |
|---|---|---|---|---|---|---|---|
| E | 51.0 | 60,728 | 46,987 | 1.29 | −33.3 | 1.46 | 3.3 |
| F | 54.4 | 143,289 | 82,826 | 1.73 | −32.0 | 3.06 | 38.3 |
| G | 49.5 | 55,157 | 39,398 | 1.40 | −49.0 | 1.44 | 1.5 |
| H | 50.3 | 85,213 | 57,576 | 1.48 | −50.4 | 1.96 | 14.9 |
| I | 58.7 | 96,261 | 62,507 | 1.54 | −11.7 | 2.15 | 19.3 |
| J | 59.2 | 73,761 | 53,450 | 1.38 | −11.8 | 1.83 | 10 |
| K | 52.6 | 206,013 | 127,169 | 1.62 | −29.9 | 3.53 | 53.8 |
| L | 57.5 | 146,565 | 91,603 | 1.6 | −1.7 | 2.89 | 38.6 |
| M | 55.8 | 52,134 | 39,797 | 1.31 | −31.9 | 1.35 | 1.1 |
| Comparative Examples | | | | | | | |
| *N | 49.8 | 96,733 | 43,884 | 2.2 | | 2.09 | 31.2 |
| *O | 43.7 | 107,506 | 50,471 | 2.13 | | 2.13 | 40.31 |
| *P | 42.8 | 119,715 | 51,677 | 2.32 | | 2.31 | 39.41 |
| *Q | 45.6 | 85,020 | 41,413 | 2.05 | | 1.74 | 24.4 |
| *R | 51.7 | 82,033 | 43,959 | 1.9 | | 1.73 | 22.5 |
| *S | 49.1 | 90,078 | 47,865 | 1.88 | | 1.7 | 23.7 |

*N is Jihua J-0030 from Jihua;
*O is Nordel 135 from Dow;
*P is LZ 7065C from Lubrizol;
*Q is LZ 7067C from Lubrizol;
*R is Jihua J-001 from Jihua and
*S is Keltan 500R from Arlanxeo.

Table 2 shows samples A-M, prepared by the PDA catalyst and comparative, commercial grade OCP samples N-S. As shown in Table 1 and FIG. 1, samples A-M have a higher thickening efficiency for a given shear stability index (SSI, ASTM D6278).

The advantaged thickening efficiency comes from the more narrow molecular weight distribution afford by the PDA catalyst and polymerization process.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

The terms "a" and "the" as used herein are understood to encompass the plural as well as the singular.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art. While the foregoing is directed to embodiments of the present disclosure, other and further embodiments of the disclosure may be devised without departing from the basic scope thereof, and the scope thereof is determined by the claims that follow.

The embodiments described hereinabove are further intended to explain best modes known of practicing it and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

What is claimed is:

1. A random ethylene and $C_3$ to $C_{20}$ alpha-olefin copolymer having:

a Mw(DRI)/Mn(DRI) of from 1.1 to 1.9;

a Mw(DRI) of from about 50,000 g/mol to about 250,000 g/mol; and an ethylene content of from about 45 wt % to about 60 wt %, wherein the random ethylene and $C_3$ to $C_{20}$ alpha-olefin copolymer comprises a crystallization temperature of about −60° C. to about 0° C.

2. The ethylene copolymer of claim 1, wherein the ethylene content is from about 45 wt % to about 55 wt %.

3. The ethylene copolymer of claim 1, wherein the ethylene content is at least 51 wt %.

4. The ethylene copolymer of claim 1, wherein said $C_3$ to $C_{20}$ alpha-olefin is propylene.

5. The ethylene copolymer of claim 1, wherein the copolymer has a thickening efficiency of about 1 to 5 and SSI of about 1 to 55.

6. A lubricating composition comprising an oil and the ethylene copolymer of claim 1.

7. The lubricating composition of claim 6, wherein the ethylene copolymer increases the kinematic viscosity at 100° C. of the oil by at least about 50%.

8. The lubricating composition of claim 6, wherein the oil comprises a polyalphaolefin.

9. The lubricating composition of claim 6, which comprises about 0.1 wt % to about 12 wt. % of the copolymer as a viscosity-index improver in the composition.

10. The lubricating composition of claim 6, which comprises at least one member selected from the group of pour point depressants, antiwear agents, antioxidants, a viscosity-index improver, dispersants, corrosion inhibitors, anti-foaming agents, detergents, rust inhibitors, and friction modifiers.

11. The lubricating composition of claim 6, which comprises from about 0.1% to about 12% of the ethylene copolymer; at least one additive selected from the group of from about 0% to about 5% of a corrosion inhibitor; from about 0.01% to about 5% of an antioxidant; from about 0.01% to about 5% of a pour point depressant; from about 0% to about 1% of an anti-foaming agent; from about 0.01% to about 6% of an anti-wear agent; from about 0.01% to about 15% of a friction modifier; from about 0.01% to about 8% of a detergent; from about 0.1% to about 20% of a dispersant and from about 0.25% to about 10% of a viscosity improving agent; and a base oil.

12. The lubricating composition of claim 6, which comprises from about 0.5% to about 12% of the ethylene copolymer; at least one additive selected from the group of from about 0% to about 1.5% of a corrosion inhibitor; from about 0.1% to about 2% of an antioxidant; from about 0.1% to about 1.5% of a pour point depressant; from about 0.001% to about 0.2% of an anti-foaming agent; from about 0.01% to about 4% of an anti-wear agent; from about 0.01% to about 5% of a friction modifier; from about 0.01% to about 4% of a detergent; from about 0.1% to about 8% of a dispersant and from about 0.25% to about 5% of a viscosity improving agent; and a base oil.

13. The ethylene copolymer of claim 3, wherein said $C_3$ to $C_{20}$ alpha-olefin is propylene.

14. The ethylene copolymer of claim 13, wherein the copolymer has a thickening efficiency of about 1 to 5 and SSI of about 1 to 55.

15. The ethylene copolymer of claim 3, wherein the copolymer has a thickening efficiency of about 1 to 5 and SSI of about 1 to 55.

16. A lubricating composition comprising an oil and the ethylene copolymer of claim 2.

17. A lubricating composition comprising an oil and the ethylene copolymer of claim 3.

18. A lubricating composition comprising an oil and the ethylene copolymer of claim 4.

19. The random ethylene and $C_3$ to $C_{20}$ alpha-olefin copolymer of claim 1, wherein the random ethylene and $C_3$ to $C_{20}$ alpha-olefin copolymer comprises a Mw(DRI) of about 50,000 g/mol to about 500,000 g/mol.

20. The random ethylene and $C_3$ to $C_{20}$ alpha-olefin copolymer of claim 1, wherein the random ethylene and $C_3$ to $C_{20}$ alpha-olefin copolymer is prepared at a temperature of about 0° C. to 25° C.

* * * * *